US012315304B2

(12) United States Patent
La et al.

(10) Patent No.: US 12,315,304 B2
(45) Date of Patent: May 27, 2025

(54) SYSTEM AND METHOD FOR A PARKING SYSTEM

(71) Applicant: HONK MOBILE INC., Toronto (CA)

(72) Inventors: Tony La, Toronto (CA); Michael Back, Toronto (CA)

(73) Assignee: HONK MOBILE INC., Toronto (CA)

( * ) Notice: Subject to any disclaimer, the term of this patent is extended or adjusted under 35 U.S.C. 154(b) by 625 days.

(21) Appl. No.: 17/436,007

(22) PCT Filed: Mar. 5, 2020

(86) PCT No.: PCT/CA2020/050296
§ 371 (c)(1),
(2) Date: Sep. 2, 2021

(87) PCT Pub. No.: WO2020/176991
PCT Pub. Date: Sep. 10, 2020

(65) Prior Publication Data
US 2022/0148340 A1 May 12, 2022

Related U.S. Application Data

(60) Provisional application No. 62/858,532, filed on Jun. 7, 2019, provisional application No. 62/813,955, filed on Mar. 5, 2019.

(51) Int. Cl.
*G07B 15/02* (2011.01)
*G06F 16/955* (2019.01)
(Continued)

(52) U.S. Cl.
CPC ......... *G07B 15/02* (2013.01); *G06F 16/9566* (2019.01); *G06Q 20/3224* (2013.01);
(Continued)

(58) Field of Classification Search
CPC ....................................................... G07B 15/02
See application file for complete search history.

(56) References Cited

U.S. PATENT DOCUMENTS

2010/0205053 A1* 8/2010 Shuster ................ G06Q 20/385
705/40
2012/0053998 A1 3/2012 Redmann et al.
(Continued)

FOREIGN PATENT DOCUMENTS

WO 2016084041 A1 6/2016
WO 2020176991 A1 9/2020

OTHER PUBLICATIONS

Jim Cherian, Mobile crowdsensing applications for intelligent parking and mobility, 2019, Nanyang Technological University (Year: 2019).*

(Continued)

*Primary Examiner* — Ismail A Manejwala
(74) *Attorney, Agent, or Firm* — Polsinelli PC

(57) ABSTRACT

Systems and methods for facilitating parking sessions are provided. The system including at least one server that is configured to: receive through a communication network, from a first remote user equipment (UE) device, information associating a unique identification (UID) encoded on an passive NFC tag with a parking zone identification (ID) that identifies a physical parking zone; update a database to associate the UID with the parking zone ID and parking rate data for the physical parking zone; host or receive a URL that includes the UID; receive, through the communication network, a message including: a license plate number from a second remote user equipment (UE) device that has read the URL from the NFC tag; and record a parking session for the license plate number for the parking zone based on the message from the second remote UE.

4 Claims, 11 Drawing Sheets

(51) Int. Cl.
  *G06Q 20/32* (2012.01)
  *H04L 67/02* (2022.01)
  *H04L 67/12* (2022.01)
  *H04W 4/80* (2018.01)

(52) U.S. Cl.
  CPC .......... *G06Q 20/3278* (2013.01); *H04L 67/02* (2013.01); *H04L 67/12* (2013.01); *H04W 4/80* (2018.02)

(56) References Cited

U.S. PATENT DOCUMENTS

| | | |
|---|---|---|
| 2012/0130775 A1 | 5/2012 | Bogaard et al. |
| 2015/0262241 A1 | 9/2015 | Shuster |
| 2017/0323227 A1 | 11/2017 | Sadeghi |
| 2018/0130265 A1* | 5/2018 | Khan .................. G07F 17/246 |
| 2018/0330346 A1* | 11/2018 | Grassadonia ...... G06Q 20/3278 |
| 2019/0043356 A1 | 2/2019 | Subramanya |
| 2020/0108824 A1* | 4/2020 | Bettger ................ G05D 1/0278 |

OTHER PUBLICATIONS

International Search Report and Written Opinion for International application No. PCT/CA2020/050296, mailed May 13, 2020, 10 pages.
Extended European Search Report, Related EP Application No. 20766303.0; Mailed Nov. 7, 2022.

* cited by examiner

SYSTEM AND METHOD FOR A PARKING SYSTEM

TECHNICAL FIELD

The present disclosure relates to parking payment systems and methods. More specifically, the present disclosure relates to parking payment systems using mobile devices.

BACKGROUND

There are currently a variety of different parking payment systems that can be deployed in gated and non-gated parking environments. In some systems, coin, banknote and/or or credit-card operated individual-spot parking meters are located adjacent respective parking spots. In other non-gated parking environments, a coin, banknote or credit card operated payment station is used for a parking zone that includes several spots. In such systems, the payment station may issue a payment receipt that can be displayed in the user's vehicle as proof of payment for a set time duration. Alternatively, the payment station may request entry of the user vehicle's license plate number. From the perspective of the parking operator, a drawback of individual spot parking meters and multi-spot payment stations is that the equipment is expensive to install and service. From the perspective of a customer, such systems are inconvenient as the user has to physically be present to make a purchase and is typically unable to make top up payments or extend time if required.

More recently, smart phone parking apps have grown in popularity. With such apps, a pre-registered user is able to purchase and pay for parking time at a parking location, and remotely make top-up payments if required. An inconvenience of these parking apps is that a user must first download the app and then register with the app operator prior to using the app. Furthermore, as many smart phone parking apps are regional, the requirement to download and register can be especially inconvenient for a visiting user.

Accordingly, there is a need for a parking payment solution that is cost efficient for parking operators and convenient for end users.

SUMMARY

According to one example aspect, there is a system for facilitating parking sessions in parking zones, the system including at least one server that is configured to: receive through a communication network, from a first remote user equipment (UE) device, information associating a unique identification (UID) encoded on an passive NFC tag with a parking zone identification (ID) that identifies a physical parking zone; update a database to associate the UID with the parking zone ID and parking rate data for the physical parking zone; host or receive a URL that includes the UID; receive, through the communication network, a message including: a license plate number from a second remote user equipment (UE) device that has read the URL from the NFC tag; and record a parking session for the license plate number for the parking zone based on the message from the second remote UE.

In some embodiments, the system includes a parking station that includes a substrate with the NFC tag inlayed on the substrate, the NFC tag encoding the URL.

According to another example aspect, there is a method for facilitating parking sessions in parking zones, the method includes: receiving through a communication network, from a first remote user equipment (UE) device, information associating a unique identification (UID) encoded on an passive NFC tag with a parking zone identification (ID) that identifies a physical parking zone; updating a database to associate the UID with the parking zone ID and parking rate data for the physical parking zone; hosting a URL that includes the UID; receiving, through the communication network, a message from a second remote user equipment (UE) device that has received the URL from the NFC tag; and recording a parking session for the parking zone.

In some embodiments, the physical parking zone includes a parking station, which includes a substrate with the NFC tag inlayed on the substrate, the NFC tag encoding the URL.

According to yet another example aspect, there is a system for facilitating parking sessions in parking zones, the system including a parking facilitator system that has at least one server configured to: receive, through a communication network and from a first remote user equipment (UE) device, information associating a unique identification (UID) encoded on an passive NFC tag with a parking zone identification (ID) that identifies a physical parking zone; update a database to associate the UID with the parking zone ID and parking rate data for the physical parking zone; host a URL that includes the UID, wherein the URL is associated with a webpage; receive, from a second remote UE device that has received the URL from the NFC tag, a HTTPS GET request for the URL; process the HTTPS GET request to determine if the request contains a cookie currently associated with a parking session for the physical parking zone; when the request contains a cookie currently associated with a parking session for the physical parking zone: determine a duration of the parking session based on the information in the cookie, and construct a webpage for the URL, the webpage showing a payment amount owed for the parking session based on the duration.

In some embodiments, the at least one server is configured to: detect a presence of the second remote UE device based on a geo-fence covering at least the parking zone; and determine that the second remote UE device is currently associated with the parking session for the parking zone.

In some embodiments, the server is configured to: upon receiving the message that the parking payment has been successfully made and a request from the second remote UE device to exit the physical parking zone, transmit a command to the physical parking zone to facilitate said exit.

In some embodiments, the physical parking zone includes a barrier, and the command to the physical parking zone has a message to open the barrier.

In some embodiments, the command to the physical parking zone is only transmitted if the request from the second remote UE device to exit the physical parking zone is received within a pre-determined time period from receipt of the message indicating that the parking payment has been successfully made.

According to an example aspect, there is a system for facilitating parking sessions in parking zones, the system has at least one server configured to: receive, through a communication network and from a first remote user equipment (UE) device, information associating a unique identification (UID) encoded on an passive NFC tag with a parking zone identification (ID) that identifies a physical parking zone; update a database to associate the UID with the parking zone ID and parking rate data for the physical parking zone; host or receive a URL that includes the UID, wherein the URL is associated with a webpage; receive, from a second remote UE device that has received the URL from the NFC tag, a HTTPS GET request for the URL; and process the HTTPS GET request to determine if the request contains a cookie currently associated with a parking session for the physical parking zone.

In some embodiments, the server is configured to, when the request does not contain a cookie currently associated with a parking session for the physical parking zone: construct a webpage for the URL, the webpage showing a parking rate for the physical parking zone; receive a request from the second UE device for pre-paid or post-paid parking; transmit a cookie to the second remote UE device; and initiate a parking session associated with the transmitted cookie.

In some embodiments, the physical parking zone has a parking station, the parking station including a substrate with the NFC tag inlayed on the substrate, the NFC tag encoding the URL.

In some embodiments, the at least one server is configured to, when the request contains a cookie currently associated with a parking session for the physical parking zone: determine a pre-paid amount for the parking session; determine a parking payment due for the parking session; and upon receiving a message that the parking payment has been successfully made and a request from the second remote UE device to exit the physical parking zone, transmit a command to the physical parking zone to facilitate said exit.

In some embodiments, the pre-paid amount is zero in a post-paid parking session.

In some embodiments, the at least one server is configured to: determine the parking payment due for the parking session based on the information contained in the cookie associated with the parking session.

According to another example aspect, there is a computer-implemented method for facilitating parking session, the method includes: receiving, through a communication network and from a first remote user equipment (UE) device, information associating a unique identification (UID) encoded on an passive NFC tag with a parking zone identification (ID) that identifies a physical parking zone; updating a database to associate the UID with the parking zone ID and parking rate data for the physical parking zone; hosting or receiving a URL that includes the UID, wherein the URL is associated with a webpage; receiving, from a second remote UE device that has received the URL from the NFC tag, a HTTPS GET request for the URL; and processing the HTTPS GET request to determine if and when the request contains a cookie currently associated with a parking session for the physical parking zone.

In some embodiments, when the request does not contain a cookie currently associated with a parking session for the physical parking zone, the method includes: constructing a webpage for the URL, the webpage showing a parking rate for the physical parking zone; and receiving a request from the second UE device for pre-paid or post-paid parking; transmitting a cookie to the second remote UE device; and initiating a parking session associated with the transmitted cookie.

In some embodiments, the physical parking zone has a parking station, the parking station including a substrate with the NFC tag inlayed on the substrate, the NFC tag encoding the URL.

In some embodiments when the request contains a cookie currently associated with a parking session for the physical parking zone, the method includes: determining a pre-paid amount for the parking session; determining a parking payment due for the parking session; and upon receiving a message that the parking payment has been successfully made and a request from the second remote UE device to exit the physical parking zone, transmitting a command to the physical parking zone to facilitate said exit.

In any of the above embodiments, instead of using a cookie which is typically sent with each HTTP or HTTPS GET request, the system or method may be configured to use a header or request parameter to initiate and track a parking session. The header or request parameter may be transmitted using a parameter (e.g. a session parameter or a local storage parameter) using JavaScript™. The system or method may be configured to set and store a value in a local storage on a customer UE device, and later retrieve the value for tracking or monitoring a parking session associated with the customer UE device.

In some embodiments, the method includes determining the parking payment due for the parking session based on the information contained in the cookie, header, or request parameter associated with the parking session.

DETAILED DESCRIPTION OF EXAMPLE EMBODIMENTS

The present disclosure is made with reference to the accompanying drawings, in which embodiments are shown. However, many different embodiments may be used, and thus the description should not be construed as limited to the embodiments set forth herein. Rather, these embodiments are provided so that this disclosure will be thorough and complete.

Figure 1:
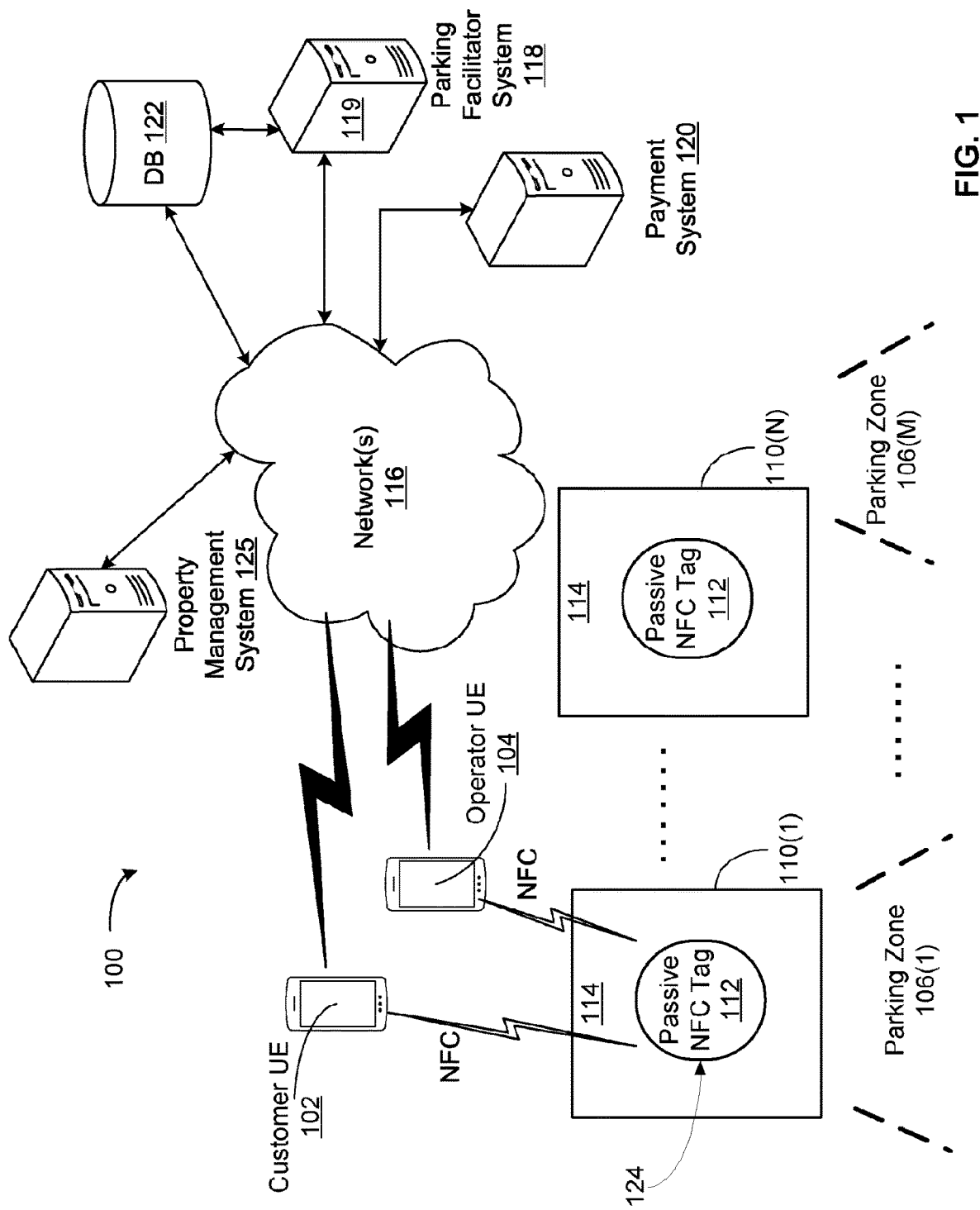
FIG. 1 is a block diagram of a parking payment system in accordance with one embodiment of the present disclosure.

The present disclosure relates to parking payment systems. Reference is first made to FIG. 1, which illustrates a parking payment system 100 in accordance with one embodiment of the present disclosure. The parking payment system allows parking customers to purchase parking sessions in respect of physical parking zones 106(1) to 106(M). As illustrated, the parking payment system 100 comprises:

a plurality of parking zone stations 110(1) to 110(N) that are each associated with one of the physical parking zones 106(1) to 106(M); one or more parking customer user equipment (UE) devices 102; one or more parking operator UE devices 104; a parking facilitator system 118; a property management system 125, and one or more payment systems 120. Customer UE devices 102 and operator UE devices 104 are each configured to communicate with parking zone stations 110(1) to 110(N) using near field communication (NFC). Customer UE devices 102, operator UE devices 104, parking facilitator system 118, property management system 125, and payment systems 120 are all configured to communicate with one or more communication networks 116.

As will be explained in greater detail below, in example embodiments the parking payment system 100 enables customers to pay for parking using a NFC-enabled customer UE device 102 without requiring the customer to download a specialized parking software application (app) and without requiring the customer to register with a parking app provider. In this regard, the parking payment system 100 provides an app-less, registration-less parking solution. Furthermore, as will be apparent from explained in greater detail below, parking zone stations 110(1) to 110(N) provide an inexpensive and convenient solution for parking operators compared to conventional parking meters and parking pay stations.

In the following disclosure, when a reference to a specific parking zone station or group of stations is not required, the reference numeral "110" is used to generically refer to any one of the N parking zone stations 110(1) to 110(N) (e.g. parking zone station 110), or to a plurality of the parking zone stations 110(1) to 110(N) (e.g. parking zone stations 110). Similarly, reference "106" is used to generically refer to a parking zone 106 or parking zones 106.

Each parking zone station 110 comprises a respective passive inlay NFC tag 112 that is inlayed on or embedded in or otherwise integrated into a supporting backing or substrate 114. As known in the art, NFC uses short-range wireless technologies to enable an NFC tag to transmit information with a simple wave or touch from an NFC-enabled reading device. As will be exampled below, in example embodiments, customer UE device 102 and operator UE device 104 are each configured to function as NFC-enabled reading devices. NFC communications typically operate at a frequency of 13.56 MHz and a distance of 4 centimeters or less. NFC-enabled reading devices function as a reader while at the same time creating an RF field that powers passive NFC tags 112 to divulge their information. In example embodiments each NFC tag 112 includes an integrated circuit that is pre-programmed with a unique ID (UID) for the NFC tag 112 as well as with an encoded Uniform Resource Locator (URL). In example embodiments, the URL includes a network address in the form of an Internet Protocol (IP) address or domain name associated with parking facilitator system 118. NFC tags 112 each have UID mirror functionality that enables the NFC tag's UID to be mirrored as a path to a specific page or file as part of its encoded URL. This feature enables every NFC tag 112 to be seen and read as unique without requiring users (parking operators and parking facilitators in the present example) to encode tags with variable numbers. In example embodiments, NFC tags 112 are based on the ISO14443A standard and are compatible with NFC Forum standards.

An illustrative example of a URL that may be pre-encoded on an NFC tag 112 is https://www.honkmobile.com/asset/ABC123 where: "https" specifies the protocol required to access the named domain; "www.honkmobile-.com" is the domain name associated with parking facilitator system 118; and "/asset/ABC123" is a path to a specific page hosted by the facilitator system 118, with "ABC123" being the NFC tag's UID. In example embodiments, the NFC tags 112 incorporated into parking zone stations 110(1) to 110(N) are all associated with the same parking facilitator system 118 (e.g. a system operated by parking facilitator "Honk-Mobile" in the present example), and thus are each encoded with the same URL domain name. However, the URL encoded on each NFC Tag 112 includes a unique path appended to the domain name, namely the NFC tag's UID. In example embodiments, the URLs encoded on NFC Tags 110 are locked from reprogramming following an initial encoding. In example embodiments, additional groups of NFC tags 112 could be encoded with URLs that have a different domain names that are associated with the same parking facilitator system 118, or which are alternatively associated with a different parking facilitator system. For ease of explanation, the present description is provided in the context of a group of parking zone stations 110(1) to 110(N) for which the respective NFC tags 112 are all associated with the same parking facilitator system 118.

In some example embodiments, substrate 114 is large enough to allow one or more of parking information (e.g. rates, location, parking zone user instructions), logos, parking operator identifier, QR codes, and other information to be displayed on the substrate for prospective customers. By way of non-limiting example, substrate 114 may be a planar, rectangular structure having a first dimension of between 6 to 20 inches and a second, perpendicular dimension of between 6 to 20 inches, with NFC tag 112 being inlayed into a central region of a front surface of the substrate 114. However, substrate 114 can also take a number of different shapes and sizes in various embodiments.

For example, in some embodiments, either in place of the NFC tag 112 or in addition to the NFC tag 112, substrate 114 can include a machine-readable code such as a bar code or a QR (Quick Response) code that may be scanned and read by an appropriate application on a mobile device. The bar code or QR code can contain information about the specific parking zone station 110 and the parking zone 106. For example, the QR codes can contain data for a locator, identifier, or tracker that points to a website URL or an application. The mobile device reading the bar code or QR code may then be prompted to visit the website at the given URL, or to open or download the given application from a website.

In some examples, planar substrate 114 may be formed from a rigid or flexible plastic material. In some examples, substrate 114 could be formed from a paper material or plasticized paper material, which in some configurations could have an adhesive on a back surface thereof to allow the substrate to be secured to a supporting surface. In some examples, substrate 114 could be formed from a rigid metal material, enabling the substrate 114 to be secured by bolts, screws or clamps to a support pole or wall or other supporting structure next to a parking zone 106.

In other examples, the substrate 114 may be built without another structure. In cases where a metal substrate material is used, the NFC tag 112 may be provided with a ferrite backing 124 and have a corresponding antenna design to enable the NFC tag 112 to operate when inlayed on the conductive substrate material. The presence of a layer of ferrite material on the NGC tag 112 provides magnetic field isolation between the IC and antenna of the NFC tag 112 and the material of substrate 114. The ferrite backing 124 redirects the inductive field from an NFC reader, and prevents energy from being wasted as heat within the metallic surface of substrate 114.

In example embodiments, facilitator system 118 comprises one or more servers 119 that are configured to communicate with one or more communications networks 116. In example embodiments, communications networks 116 include the Internet, and as noted above, a network address for the facilitator system 118 is encoded as part of a unique URL on each of the passive NFC tags. As will be explained in greater detail below, parking facilitator system 118, which may be operated by an $3^{rd}$ party entity such that a parking facilitator, is configured to: (i) enable a parking zone operator to register and deploy parking stations 110; (ii) enable customers to purchase and pay for a parking session for a vehicle in parking zones 106 that are associated with parking zone stations 110; (iii) enable the parking zone operator to have real time-feedback that identifies the vehicles that have validly purchased parking time in a parking zone 106; and (iv) enable the parking zone operator to receive payment for parking sessions purchased by customers.

In example embodiments, payment system(s) 120 include one or more servers that are enabled to communicate with networks 116 and that are operated by third party payment services such as a credit card transaction processing services or a payment app transaction processing services (e.g. Apple Pay™ or Google Pay™).

Figure 2:
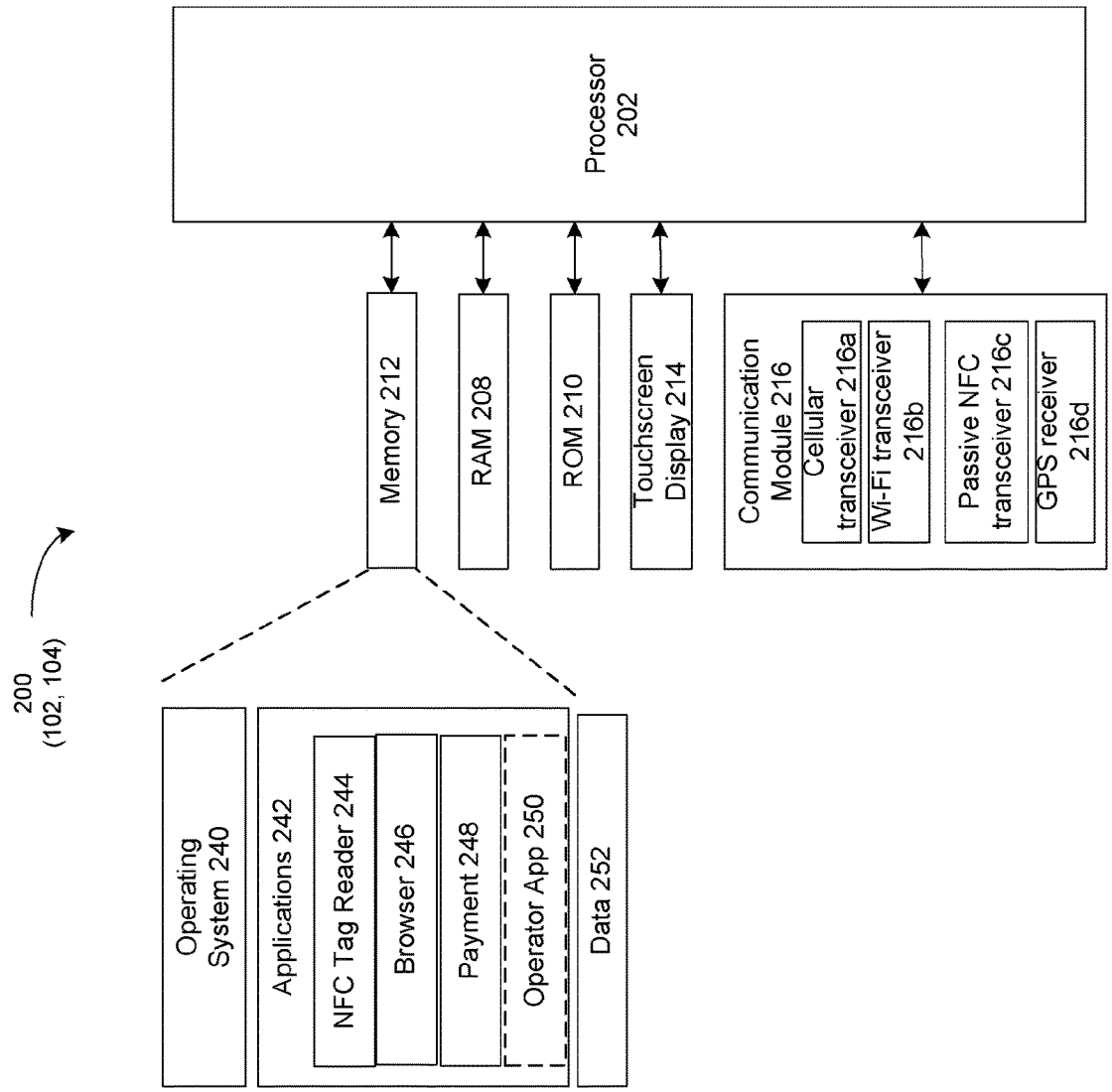
FIG. 2 is a block diagram of a user equipment device suitable for use as a parking customer user equipment (UE) device or parking operator UE device in accordance with one embodiment of the present disclosure.

FIG. 2 illustrates a simplified block diagram of a mobile communication device 200 that could, in example embodiments, be used to implement customer UE device 102 or parking operator UE device 104. The mobile communication device 200 includes a controller comprising at least one processor 202 (such as a microprocessor) which controls the overall operation of the mobile communication device 200. The processor 202 is coupled to a plurality of components via a communication bus (not shown) which provides a communication path between the components and the processor 202. The mobile communication device 200 may be, but is not limited to, a smartphone, a tablet, a laptop, or smartwatch.

The mobile communication device 200 comprises, among other components: RAM 208, ROM 210, a persistent (non-volatile) memory 212 which may be flash EPROM ("flash memory") or other suitable form of memory, a touchscreen display 214, and a communication module 216 for wireless communication. In addition to touchscreen display 214, device 200 may also include one or more input device(s) (such as a keyboard or keypad, one or more buttons, one or more switches, a touchpad, a rocker switch, a thumbwheel, a microphone, or other type of input device) and one or more output devices (e.g. speaker, hard wired or wireless audio signal output, and/or vibration device).

The communication module 216 comprises: a wireless wide area network (WWAN) transceiver such as a cellular transceiver 216a for communicating with a WWAN network that is part of communications networks 116; a wireless local area network (WLAN) transceiver such as a Wi-Fi transceiver 216b for communicating with a Wi-Fi network that is linked to communications networks 116; one or more short-range wireless transceiver such as an NFC transceiver 216c that is configure to read passive NFC tags 112; and a satellite positioning system receiver such as GPS receiver 216d that is configured to receive geo-positioning information from satellites.

Operating system software 240 executed by the processor 202 is stored in the persistent memory 212, such as flash memory, but may be stored in other types of memory devices, such as ROM 210 or similar storage element. Device user data 252 is also stored in the persistent memory 212. System software, software modules, specific device applications, or parts thereof, may be temporarily loaded into a volatile store, such as RAM 208, which is used for storing runtime data variables and other types of data or information. Communication signals received by the mobile communication device 200 may also be stored in the RAM 208. Although specific functions are described for various types of memory, this is merely one example, and a different assignment of functions to types of memory may be used in other embodiments.

The processor 202, in addition to its operating system functions, enables execution of software applications 242 on the processing device 200. Applications or software modules that control device operations may be installed on the processing device 200 during manufacture and/or subsequently downloaded and installed via communication module 216. The persistent memory 212 includes installed applications and user data, such as saved files, among other data. In example embodiments, the applications 242 include, as part of a set of default manufacturer installed software, software instructions that enable the device 200 to implement an NFC tag reader module 244. NFC tag reader module 244 configures the device 200 to control NFC transceiver 216 to read passive NFC tags and to act on information received through the NFC transceiver 216 from NFC tags.

The applications 242 also include software instructions that enable the device 200 to implement an Internet browser 246 for viewing and interacting with web pages on the touchscreen display 214. At least in some examples, the applications 242 also include software instructions that enable the device 200 to implement a payment function 248 that interacts with payment system 120. In example embodiments, software instructions for implementing Internet browser 246 and, in some cases, payment function 248 are part of the set of default manufacturer installed software present on the device 200. In the case of a parking operator UE device 104, the applications 242 include software instructions that enable the device 200 to implement an Operator App 250 for performing registration, deployment and monitoring functions described below. For example, the software for Operator App 250 can be downloaded to parking operator UE device 104 from an application distribution service (e.g. Apple APP Store™ in the case of an iOS™ enabled devices or Google Play™ in the case of an Android™ enabled devices). Once installed on parking operator UE device 104, the Operator App 250 enables parking operator UE device 104 to exchange information with parking facilitator system 118 through communication networks 116 so that the parking operator can register and configure a parking operator account with the parking facilitator system 118.

Figure 3:
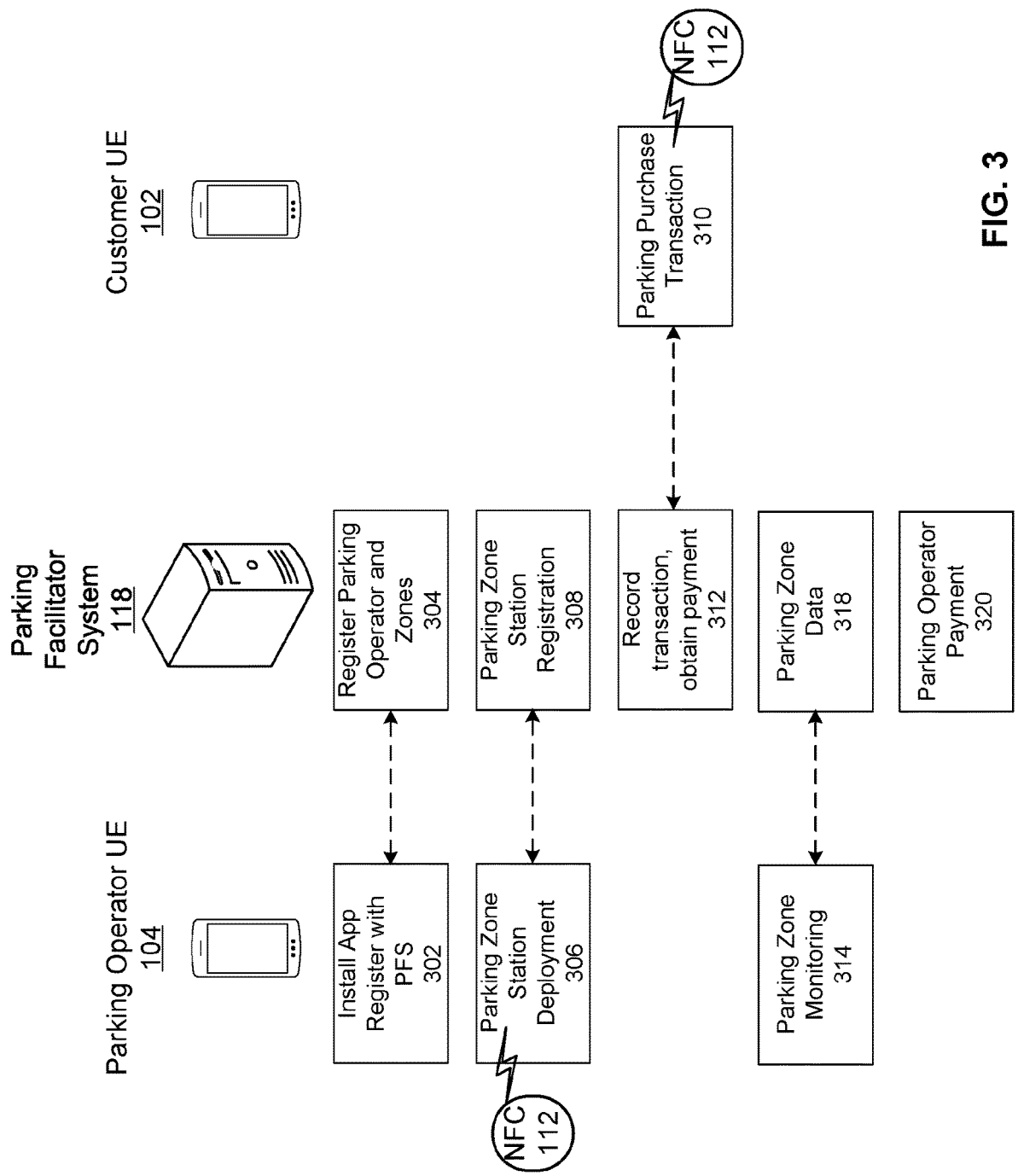
FIG. 3 is a block diagram summarizing functions that are performed at components of the parking payment system of FIG. 1 in accordance with example embodiments of the present disclosure.

FIG. 3 is a block diagram illustrating functions that are performed at each of parking operator UE device 104, parking facilitator system 118, and parking customer UE 102 during operation of system 100. The dashed lines in FIG. 3 illustrate communications between the respective UE devices 102, 104 and parking facilitator system 118 that occur through one or more communication networks 116, including the Internet.

Functions that are performed at parking operator UE 104 and parking facilitator system 118 during a parking operator registration and configuration process are respectively represented by Blocks 302 and 304 of FIG. 3. As indicated by Block 302 of FIG. 3, in example embodiments, a parking operator enrolls with parking facilitator system 118 by downloading and installing the software for Operator App 250 (see e.g. FIG. 2) to the parking operator's UE device 104. Once properly activated (e.g. through a user registration process) on parking operator UE device 104, the Operator App 250 enables parking operator UE device 104 to exchange information with parking facilitator system 118 through communication networks 116 so that the parking operator can register and configure a parking operator account with the parking facilitator system 118. With reference to Block 304, as part of the information exchanged during the registration process and/or follow up sessions, the parking facilitator system 118 receives parking operator data about the parking operator associated with UE device 104, including: name (e.g. corporate or business name in the case of a commercial entity) and contact information for the parking operator; payment details and instructions for transferring payments to the parking operator; a parking zone identification (ID) for each of the parking zones 106(1) to 106(N) associated with the parking operator; an indication of the number of physical parking spaces associated with each parking zone 106; and parking rate data for each parking zone 106. In example embodiment, parking facilitator system 118 maintains a database 122 (FIG. 1) that includes digital records for each parking operator registered with the parking facilitator system 118. By way of illustrative example, Table 1 below shows an example of parking operator data that could be recorded in database 122 following registration of a parking operator and the parking zones associated with the parking operator:

TABLE 1

Parking Operator Data
Parking Operator Name: ABC Co.
Contact Details: (Corporate address; email; phone)
Payment Details: (Bank transfer details)

| Parking Zone ID Municipal Address | Zone Number | Number of parking spaces | Rate Data |
|---|---|---|---|
| 12 Address Ave, Sometown | 1234 (106(1)) | 1 | $3/hr; $7.50/day |
| 12 Address Ave, Sometown | 1235 (106(2)) | 3 | $3/hr; $7.50/day |
| . . . | | | |
| 321 Bo Ave., Anytown | 1238 (106(N)) | 5 | $8/hr; $40/day |

As will be noted from Table 1, in an example embodiments parking zone ID for each parking zone 106 could include a municipal street address and a unique zone number that identifies a parking zone 106 at the municipal address. Additionally, in example embodiments the number of physical parking spaces associated with each parking zone can be set. For example, at some locations, a 1:1 ratio of parking zones 106 and zone stations 110 to physical vehicle parking spaces can be set by the parking operator, and at some locations a higher ratio of parking spaces to parking zones 106 and parking zone stations 110 can be set.

In example embodiments additional parking operator data can be provided by the parking operator for inclusion in database 122. For example, parking operator data may include a set of GPS coordinates for each parking zone. For another example, the parking operator data may also include information about the physical attributes of each parking zone including for example: an indication if electric vehicle charging stations are present; if the parking zone is, or is within, a multi-level parking garage, above ground, below ground, and/or a surface lot; special parking instructions such as height or size restrictions; one or more image files of the parking zone location; and GPS coordinates for the parking zone.

In example embodiments, the Operator App 250 is configured to provide parking zone set-up and configuration user interfaces on the operator UE device 104 to elicit the parking operator data shown in Table 1 from the parking operator, and send the parking operator data to parking facilitator system 118. Included in the parking operator data is an indication of how many parking zone stations 110 the parking operator requires (e.g. N in the present example). In some examples, the parking operator data obtained by parking facilitator system 118 through the Operator App 250 may also include instructions from the parking operator about what style (e.g. shape, dimensions, material type, mounting system) of substrate 114 to use for the parking zone stations 106 and what visual content to include on the substrate 114. For example, a parking operator may specify that they require rectangular metallic signs with holes for bolts, with a company logo printed on the signs. In example embodiments, the parking operator may be requested through Operator App 250 for payment information for purchase and shipping of the parking zone stations 110.

Based on the parking operator data received through set-up and configuration user interfaces provided by Operator App 250 on the operator UE device 104, the parking facilitator system 118 (or an entity or person associated with the parking facilitator system 118) can arrange to have parking zone stations 110(1) to 110(N) customized (e.g. specified text and indicia applied to substrate 114 of specified shape, dimensions and material) as required and shipped in accordance with the contact information included in the parking operator data. In example embodiments, prior to shipping, the UIDs of the NFC tags 112 of the parking zone stations 110(1) to 110(N) are recorded in parking facilitator system database 122 and associated with the parking operator that they are being shipped to. In example embodiments, the parking facilitator system 118 is configured to establish a webpage or file for each of the NFC tags 112 that corresponds to the URL encoded on each of the NFC tags 112.

Functions that are performed at parking operator UE 104 and parking facilitator system 118 as part of a parking station deployment process are represented respectively as Blocks 306 and 308 of FIG. 3. In example embodiments, the Operator App 250 configures operator UE device 104 to collect parking zone station deployment data (Block 306) and send that data to parking facilitator system 118 thorough communication networks 116 (including for example a cellular network and the Internet). Based on the received parking zone station deployment data, parking facilitator system 118 is configured to register the parking zone stations 110(1) to 110(N) (Block 308). In a typical deployment example, the parking zone operator receives shipment of the parking zone stations 110(1) to 110(N), and then physically mounts each parking zone station 110(1) to 110(N) at a visible location next to a physical parking zone 106 that the parking zone station 110(1) to 110(N) is to be associated with. Using Operator App 250 on parking operator UE device 104, the parking zone operator can perform a deployment procedure that enables the parking facilitator system 118 to associate each of the parking zones 106(1) to 106(N) with one of the parking zone station 110(1) to 110(M). In some applications, multiple parking zone stations 110 may be associated with the same parking zone 106, and in some applications a parking zone 106 may have only a single parking zone station 110 associated with it.

Figure 4C:
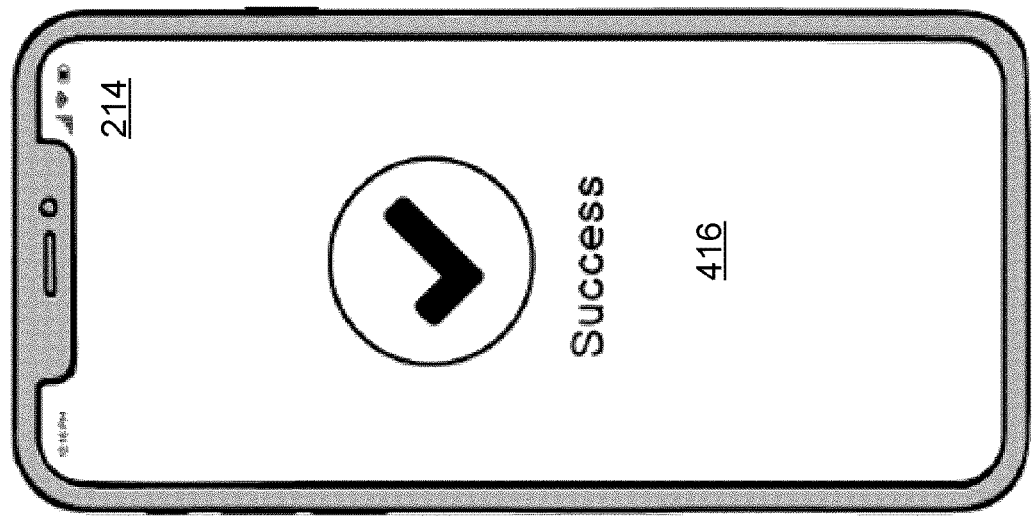
FIGS. 4A to 4C show examples of user interface (UI) screens displayed on a parking operator UE device in accordance with example embodiments of the present disclosure.
Figure 4B:
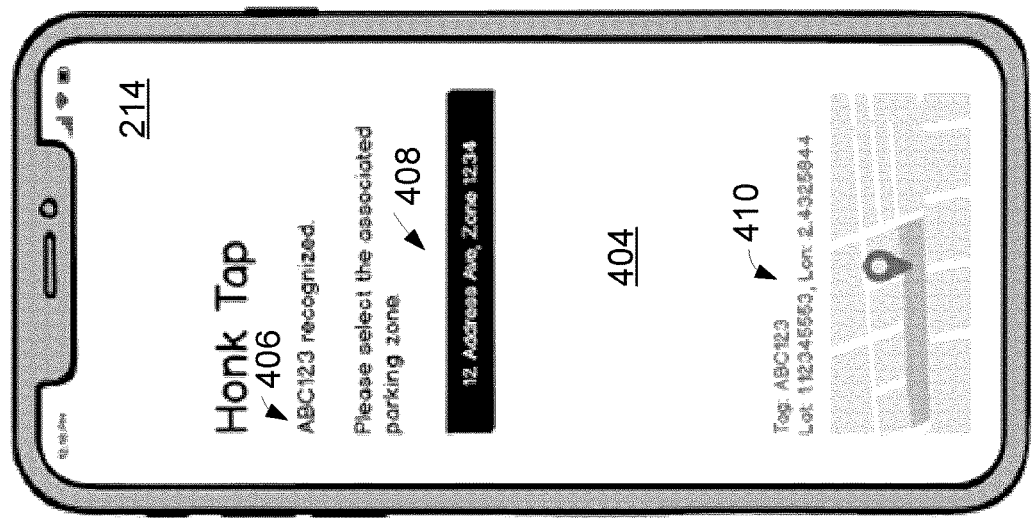
Figure 4A:
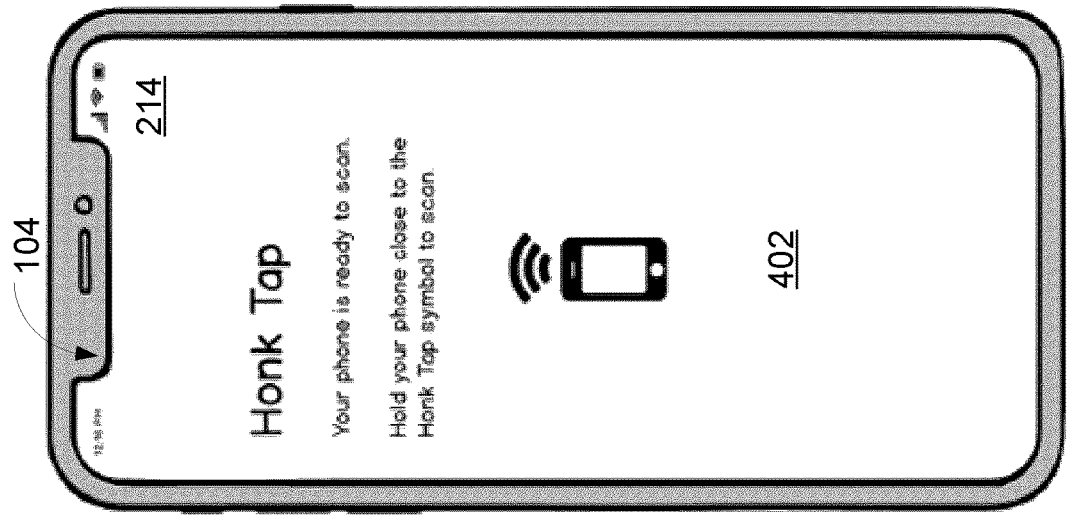

In this regard, FIGS. 4A to 4C show user interface screens that can presented on parking operator UE device 104 by Operator App 250 during the deployment process for a particular parking zone station 110(1). As shown in FIG. 4A, when a deployment option is selected, Operator App 250 causes a "tap" UI screen 402 to appear on the touchscreen display 214 of parking operator UE device 104 that instructs the device user to bring the UE device 104 within passive NFC reading distance of the NFC tag 112 of the parking zone station 110(1). The NFC transceiver 216c of UE device 104 reads the URL encoded on the NFC tag 112. As noted above, the URL include the UID of the NFC tag 112. As indicated at FIG. 4B, once the NFC tag 112 has been read, the tag UID 406 is displayed as part of a UI screen 404 on parking operator UE device 104. Furthermore, a dropdown menu or scrollable list 408 of the parking zone IDs for parking zones 106(1) to 106(M) previously associated with the parking operator are displayed. In example embodiments, the list of parking zones 106(1) to 106(M) is obtained by parking operator UE device 104 from parking facilitator system 118, although the list could also be stored locally as user data 252. The parking zones 160 may also be selected and set up by the parking operator via the UE device 104. In the illustrated example, of FIG. 4B, the user has selected parking zone ID "12 Address Ave, Zone 1234" (e.g. parking zone 106(1)) from the list and a corresponding parking zone ID is displayed. The UE device 104 is configured by Operator App 250 to transmit the UID for the NFC tag 112 and the selected parking zone ID to parking facilitator system 118. Furthermore, in example embodiments, UE device 104 is configured by Operator App 250 to record, based on satellite positioning such as GPS information, location data 410 for the UE device 104 at the time the NFC tag 112 was read. The location data 410 may for example include latitude and longitude, thus enabling the location of the parking zone station 110(1) to be geocached. The location information is also sent to parking facilitator system 118. As indicated at FIG. 4C, UE device 104 is configured by Operator App 250 to provide user interface screen 416 on UE device 104 indicating when the deployment data for a parking zone station 110(1) has been successfully collected and sent to parking facilitator system 118.

In example embodiments, failure to successfully transmit the deployment data may result in a feedback screen advising the operator that the present location of the parking zone station 110(1) is untenable due to bad signal connection to a network, indicting that remedial action such as moving the station or providing alterative network connection (e.g. Wi-Fi) access point at location may be required.

Referring to FIG. 3, as will be appreciated from the above description, during the deployment function represented by Block 308 the parking facilitator system 118 receives the following deployment data for each deployed parking zone station 110 from a parking operator UE device 104: the UID for the parking zone station 110; the parking zone ID for the physical parking zone at which the parking zone station 110 has been physically deployed; and geocache location information indicating the physical location of the parking zone station 110. In example embodiments, the deployment information is added to the database 122.

By way of illustrative example, Table 2 below shows an example of parking operator data that could be recorded in database 122 following deployment of parking zone stations 110(1) to 110(N) by a parking operator:

TABLE 2

Parking Operator/Deployment Data
Parking Operator Name: ABC Co.
Contact Details: (Corporate address; email; phone)
Payment Details: (Bank transfer details)

| Parking Zone ID | | Number | | Deployment Data | |
| --- | --- | --- | --- | --- | --- |
| Municipal Address | Zone Number | of parking spaces | Rate Data | NFC TAG UID | LAT/ LONG |
| 12 Address Ave, Sometown | 1234 (106(1)) | 1 | $3/hr; $7.50/day | ABC123 | 11.2345553 2.4325844 |
| 12 Address Ave, Sometown | 1235 (106(2)) | 3 | $3/hr; $7.50/day | ABC124 | 11.2345845 2.4325848 |
| 12 Address Ave, Sometown | 1235 (106(2)) | 3 | $3/hr; $7.50/day | ABC125 | 11.2345845 2.4325848 |
| • • • | | | | | |
| 321 Bo Ave., Anytown | 1238 (106(N)) | 5 | $8/hr; $40/day | ABCXXX | 43.653963 −79.387207 |

Thus, at the completion of parking zone station deployment process, the parking facilitator system 118 is configured to provide a webpage or file for each of the NFC tags 112 that corresponds to the URL encoded on each of the NFC tags 112, and database 122 includes rate information and a respective unique parking zone ID associated with each of the respective NFC-specific URLs hosted by the parking facilitator system 118. As can be seen in Table 3 above, two parking stations can be associated with the same parking zone.

It will be understood that a parking operator may have multiple employees using respective UE devices 104, and accordingly different parking operator UE devices 104 could be sending deployment data for different parking zone stations 110 to parking facilitator system 118.

Functions that are performed at parking customer UE device 102 and parking facilitator system 118 as part of a parking session purchase and payment process are represented respectively as Blocks 310 and 312 in FIG. 3.

As further described below in detail, the parking facilitator system 118 may be configured for both pre-paid (e.g. FIG. 5) and post-paid scenarios (e.g. FIG. 10), and a customer may be prompted to elect if he or she wishes to pre-pay or post-pay for the parking session at the beginning of a parking session for a particular parking zone. A customer may park his or her vehicle in a parking zone 106, and taps a customer UE device 102 on a parking station 110 associated with the parking zone 106. The NFC tag on the parking station receives the signal from the UE device 102 and sends a web link to the UE device 102 in order to facilitate a parking session. In some example embodiments, when the customer elects not to pre-pay for the parking session, then he or she may be deemed to have requested a post-paid parking session. Alternatively, the system 118 may set post-paid as a default payment method for all users. As described below, the parking facilitator system 118 can determine, via an NFC tag 112 of a parking station 110 associated with a parking zone 106(i) and a cookie, header, or request parameter that may be present or absent from a customer UE device 102, whether the customer UE device 102 is currently associated with a parking session for the parking zone. If the customer UE device 102 is not yet associated with any parking session for the parking zone, then the customer UE device 102 is deemed to have requested a new parking session. The customer may be prompted to select, prior to starting the new parking session, if he or she wishes to pre-pay for the parking session. If the customer selects the pre-pay option, the parking facilitator system 118 may check if there is any complimentary parking offer, incentive or promotion that can be applied to the parking session. For example, the first 30 minutes of the parking session may be free; in this case the parking facilitator system 100 may cause the customer UE device 102 to display a message informing the customer that the first 30 minutes of parking is free, and he or she may pre-pay for the parking session based on an initial parking duration, e.g. 1 or 2 hours. The initial parking duration may be selected by the customer via a display of the customer UE device 102 in any pre-determined incremental units, such as 30 minutes ($0 parking fee), 40 minutes ($5 parking fee), 50 minutes ($10 parking fee), and so on. Alternatively, the initial parking duration may be selected by the customer based on a time that the parking session is expected to end. An example UI display on the customer UE device 102 for the customer to select an end time for the parking session and a corresponding parking rate is shown in FIG. 6. Once the parking duration is determined, the parking facilitator system 118 may be configured to calculate and present a pre-paid amount on the customer UE device 102, and to process a transaction from the customer UE device 102 based on payment information entered by the customer via customer UE device 102. A timer may be activated as soon as the payment has been processed, and appropriate reminders may be sent to the customer via SMS message or e-mail based on the timer and the pre-paid initial parking duration. The timer function may be implemented and executed based on the timestamp of one or more messages sent from the customer UE device 102, as well as the timestamp of the cookie sent to the customer UE device 102. Once the customer has returned to the parking facility and tapped the parking zone station again using the same customer UE device 102, the parking facilitator system 118 may be configured to calculate a total parking duration based on the timer, and in turn determine if the pre-paid amount is sufficient to cover the total parking duration. If the pre-paid amount is not enough to cover the total parking duration, the parking facilitator system 118 calculates the amount due to be paid by the customer, and causes a message to be displayed on the customer UE device 102 regarding the amount due. Once a payment has been received from the customer UE device 102 for the amount due, the parking facilitator system 118 may mark the parking session as complete and paid, and let the vehicle associated with the customer UE device 102 leave the parking facility.

If the customer elects not to pre-pay for the parking session, then the customer is deemed to have requested a post-paid parking session, which is described in detail in association with FIGS. 10 and 11 below. The parking facilitator system 118 may check if there is any suitable parking offer, incentive or promotion that can be applied to the parking session. For example, an offer may be that the first 30 minutes of the parking session may be free; in this case the parking facilitator system 100 may cause the customer UE device 102 to display a message informing the customer that the first 30 minutes of parking is free, and he or she may post-pay for the parking session. The customer does not need to make any payment upfront prior to starting of the parking session. A timer for the parking session may started as soon as the customer has elected to start the parking session, based on a timestamp of a message from the customer UE device 102 informing the customer's intention to start the parking session. In some embodiments, the timer may be started as soon as the customer UE device 102 has tapped a parking station. Once the customer has returned to the parking facility and tapped the parking zone station again using the same customer UE device 102, the parking facilitator system 118 may be configured to calculate a total parking duration based on the timer, and check if there is any applicable free parking offer, incentive or promotion. The final amount due may be calculated based on the total parking duration and any applicable free parking offer, incentive, or promotion. The parking facilitator system 118 then calculates the final amount due to be paid by the customer, and causes a message to be displayed on the customer UE device 102 regarding the final amount due if there is a balance to be paid. Once a payment has been received from the customer UE device 102 for the final amount due, the parking facilitator system 118 may mark the parking session as complete and paid, and let the vehicle associated with the customer UE device 102 leave the parking facility.

In a very simple example embodiment, once a customer parks a vehicle and taps his or her device 102 on a parking station 110, the parking facilitator system 118 can determine, via an NFC tag 112 of a parking station 110 associated with a parking zone 106(i) and a cookie that may be present or absent from a customer UE device 102, whether the customer UE device 102 is currently associated with a parking session for the parking zone. If the customer UE device 102 is not yet associated with any parking session for the parking zone, then the customer UE device 102 is deemed to have requested a new parking session. A cookie may be sent to the customer UE device 102 for keeping track of the parking duration, and a timer may be activated based on the timestamp of the cookie being sent. Once the customer has returned to the parking facility and tapped the parking zone station 110 again using the same customer UE device 102, the parking facilitator system 118 may be configured to calculate a total parking duration based on the timer, and in turn determine a final amount due for the parking session based on the total parking duration. The parking facilitator system 118 can send a message to be displayed on the customer UE device 102 regarding the amount due. Once a payment has been received from the customer UE device 102 for the amount due, the parking facilitator system 118 may mark the parking session as complete and paid, and let the vehicle associated with the customer UE device 102 leave the parking facility.

Figure 5:
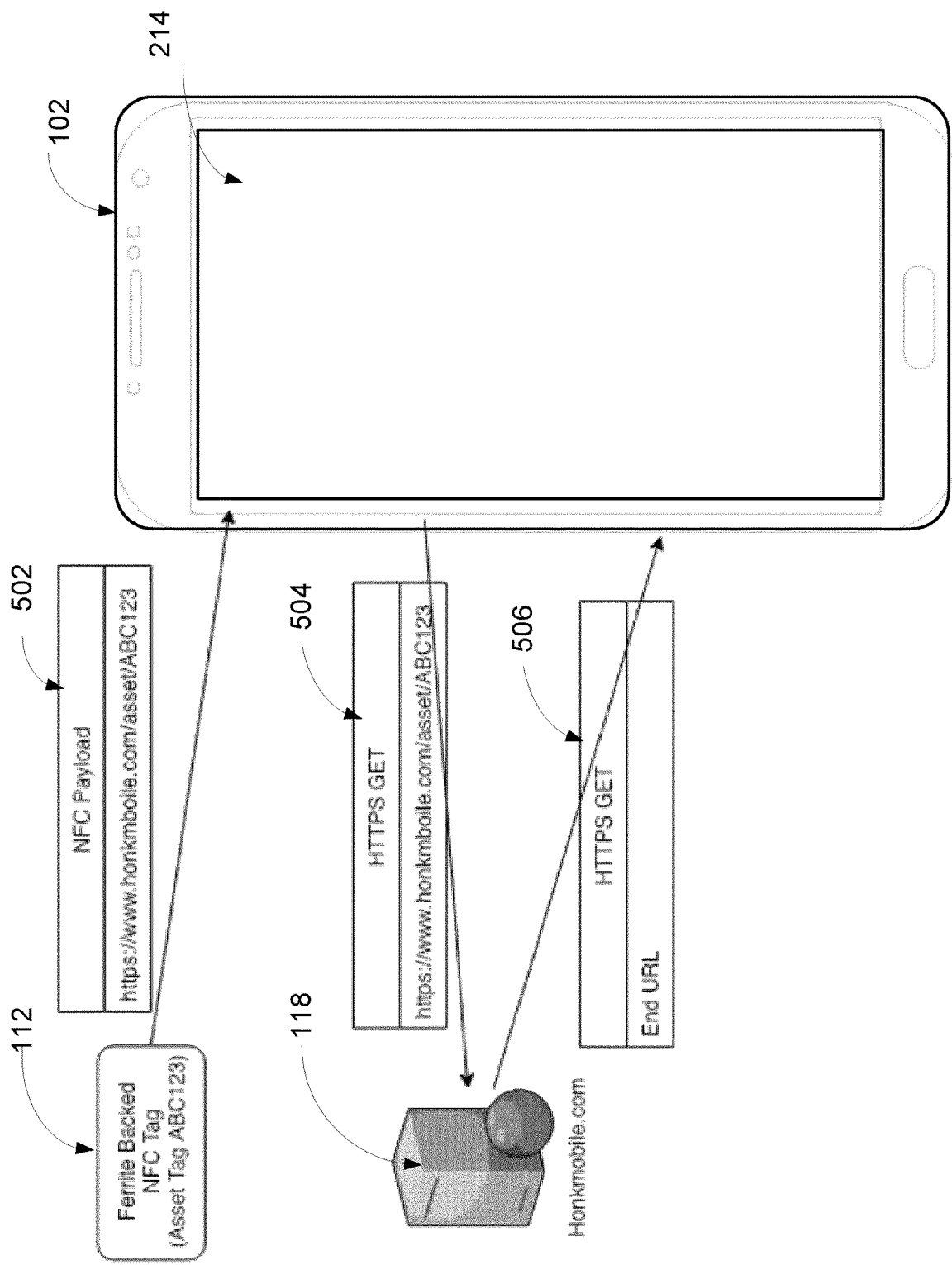
FIG. 5 is a block diagram illustrating communications between a parking operator system and a parking customer UE device in accordance with example embodiments of the present disclosure.
Figure 6:
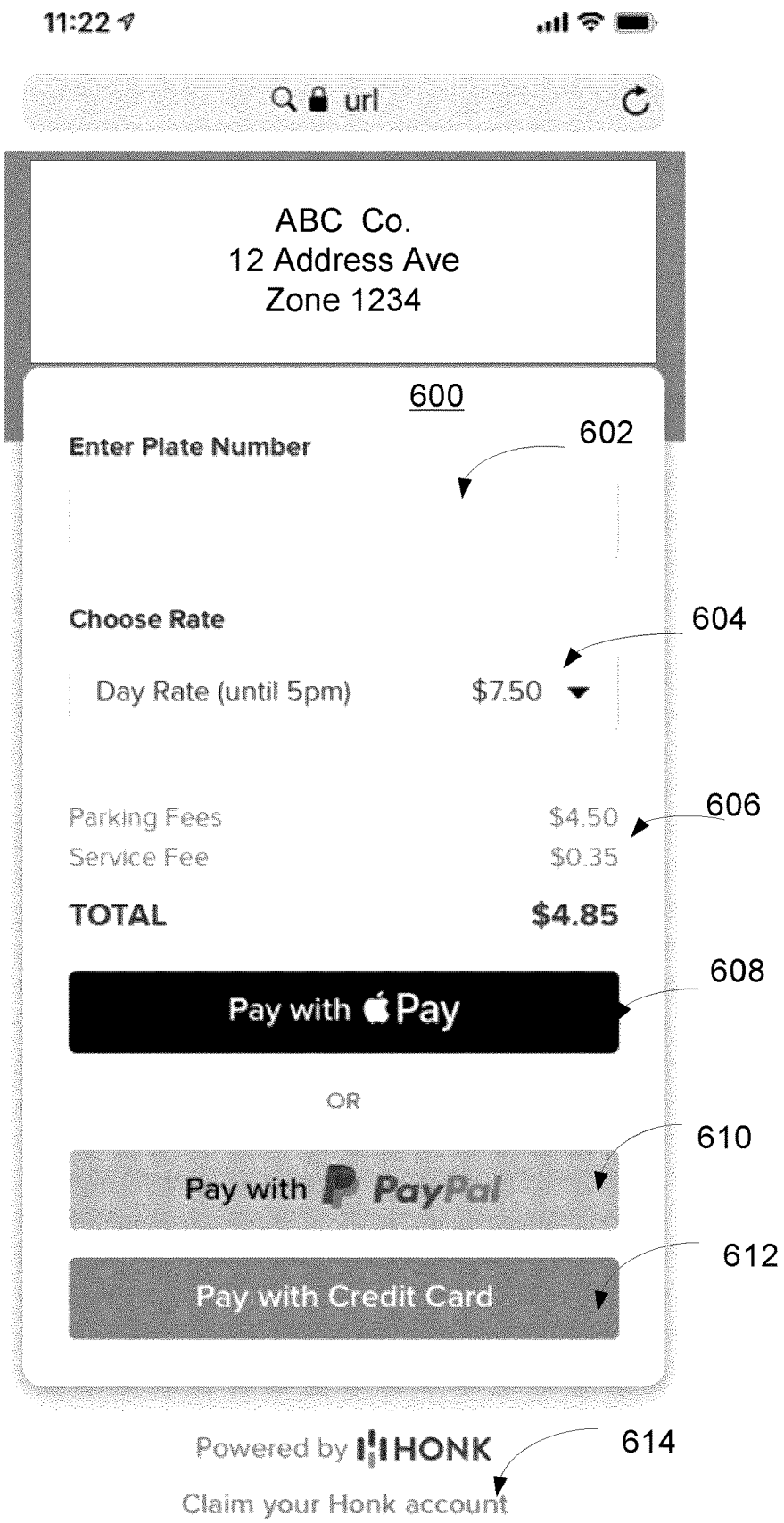
FIGS. 6, 7, 8 and 9 show examples of UI screens displayed on a parking customer UE device in accordance with example embodiments of the present disclosure.
Figure 7:
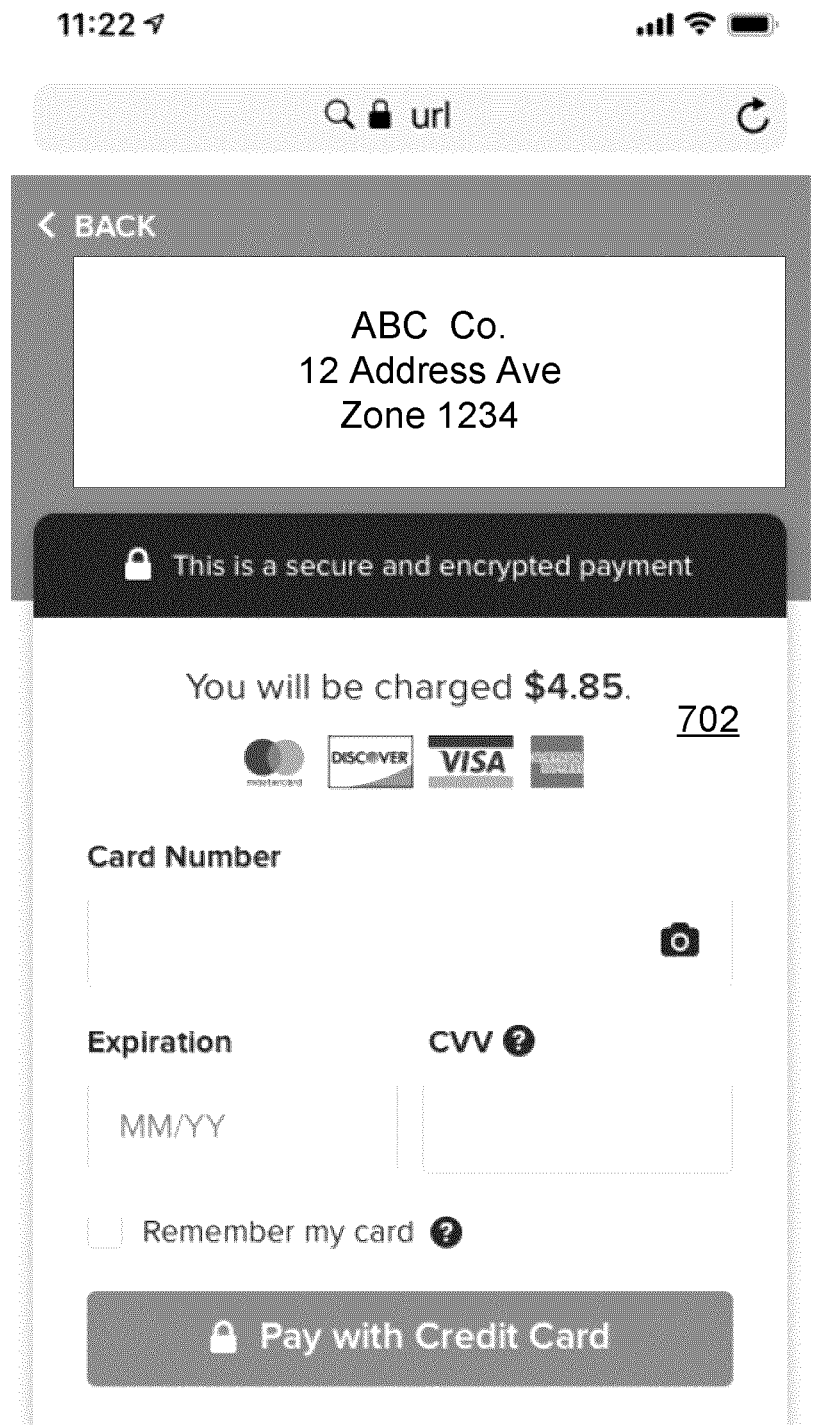
Figure 8:
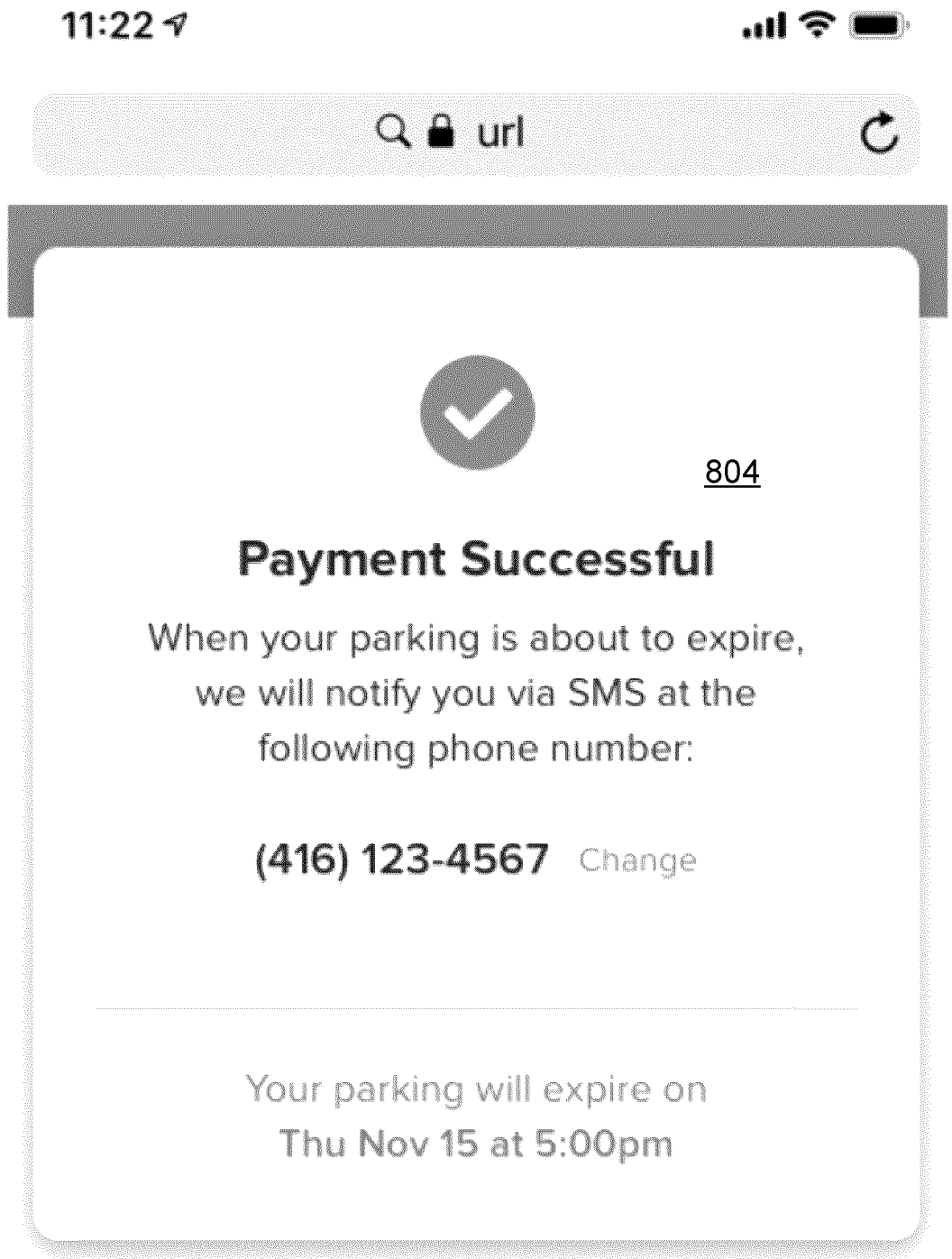

FIG. 5 illustrates signalling that occurs during the parking purchase and payment process, and FIGS. 6 through 8 illustrate UI screens that are displayed on a display screen 214 of parking customer UE device 102 throughout the process. As disclosed above, in example embodiments, only default software that is installed on customer UE device 102 by the UE device manufacturer is required for the customer to purchase and pay for a parking session. A dedicated parking app is not required.

In this regards, as indicated in FIG. 5, a customer who desires to purchase a parking session in a parking zone 106 begins the process by bringing customer UE device 102 sufficiently close to the parking zone station 110($i$) (where i=1, ..., N) that is associated with the parking zone 106($i$) to read the URL encoded on the NFC tag 112 of the parking zone station 110($i$). In example embodiments, the customer UE device 102 is configured by NFC tag reader module 244 to periodically send RF signals to interrogate and NFC devices that may be within range, and accordingly a prospective customer can initiate the parking purchase and payment process simply by tapping (or by coming with NFC range, for example 5 cm), of the passive NFC tag 112 of the parking zone station 110($i$).

Once in range of NFC tag 112, the NFC transceiver 216$c$ of the customer UE device 102 receives the URL encoded on the NFC tag 112, which includes a path to a unique webpage hosted by parking facilitator system 118 for the parking zone station 110($i$). In the example of FIG. 5, the URL included in the NFC payload 502 received by NFC tag reader module 244 of customer UE device 102 is https://www.honkmobile.com/asset/ABC123. In example embodiments, the NFC tag reader module 244 interacts with web browser 246 of customer UE device 102 to automatically direct the web browser 246 to the URL and open a corresponding UI display screen 600 (see FIG. 6) on the device display 114. In some example embodiments, a user notification is displayed on the display 114 of customer UE device 102 and a user conformation input is required before the web browser 246 is directed to the URL and opens the corresponding UI display screen 600. In some embodiments, the NFC tag reader module 244 may interact with the operation system (e.g. iOS™ or Android™) of customer UE device 102 to automatically open a corresponding UI display screen 600 (see FIG. 6) on the device display 114, for example via a third party application.

In some embodiments, instead of or in addition to the NFC tag 112, the parking station 110 may have a machine-readable code such as a QR code that may be scanned and read by an appropriate application on a mobile device. The QR code can contain information about the specific parking zone station 110 and the parking zone 106. For example, the QR code can contain data directing to a website URL. The customer UE device 102 sends an HTTPS GET message 504 to the specified URL, which in the illustrated example is a webpage hosted by parking facilitator system 118.

In some embodiments, referring again to FIG. 5, subsequent to receiving the URL included in NFC payload 502, the customer UE device 102 sends an HTTPS GET message 504 to the specified URL, which in the illustrated example is a webpage hosted by parking facilitator system 118. In response, the parking facilitator system 118 sends a response 506 and establishes a parking purchase and payment session with the customer UE device 102 during which the parking facilitator system 18 provides instructions and data to the browser 246 of customer UE device 102 to enable UI display screes such as that shown in FIGS. 6 to 8. As indicated in FIG. 6, which shows an example user interface displayed on a customer UE device 102 for a pre-paid parking session, based on the NFC tag UID included in the URL of the HTTPS GET message 504, the parking facilitator system 118 accesses its database 122, determines the parking Zone ID that is associated with the NFC tag UID, along with parking options and rates, and provides that information (e.g. 12 Address Ave, Zone 1234) for display in UI display screen 600. UI display screen 600 includes a user input field 602 for the customer to input a vehicle license plate that is then sent to parking facilitator system 118. Furthermore, UI display screen 600 includes a dropdown menu or list 604 of the different parking options and rates for the parking zone 106($i$) for the customer to select from. Once the customer selects a rate option from list 604, fee amounts 606 for the selected option are displayed UI display screen 600. In embodiments, the parking facilitator system 118 is configured to check for any eligible offer, incentive or promotion (e.g. first half an hour of parking is free) for the parking zone 106($i$), and if such an offer, incentive or promotion is found, the parking facilitator system 118 can automatically re-calculate the fee amounts 606 based on an applicable free parking offer applied to the parking zone 106($i$). In example embodiments, the user is presented with different payment options, for example payment option 608 that relies on embedded payment function 248 such as Apple Pay™ or Google Pay™; payment option 610 that relies on a service such as PayPal™; and/or a credit card payment option 612. Selection of any of payment options 608, 610, 612 results in parking facilitator system 118 processing the payment for the displayed fee amounts 606 with third party payments systems 120 using common payment processing techniques. By way of example, FIG. 7 illustrates a credit card payment UI interface screen 702 that can be displayed upon receiving a customer input selecting credit card payment option 612, and FIG. 8 illustrates a "Payment Successful" UI display screen 804 displayed by browser 246 once parking facilitator system 118 has successfully processed a payment.

As part of recording the transaction and obtaining payment (Block 312), the parking facilitator system 118 updates the records associated with respective parking zone 110 in database 122 to record details of the parking purchase transaction, including the license plate number of the vehicle that has been entered by the customer as occupying the parking zone 110, and the time duration and payment amount of the purchased parking session.

Figure 9:
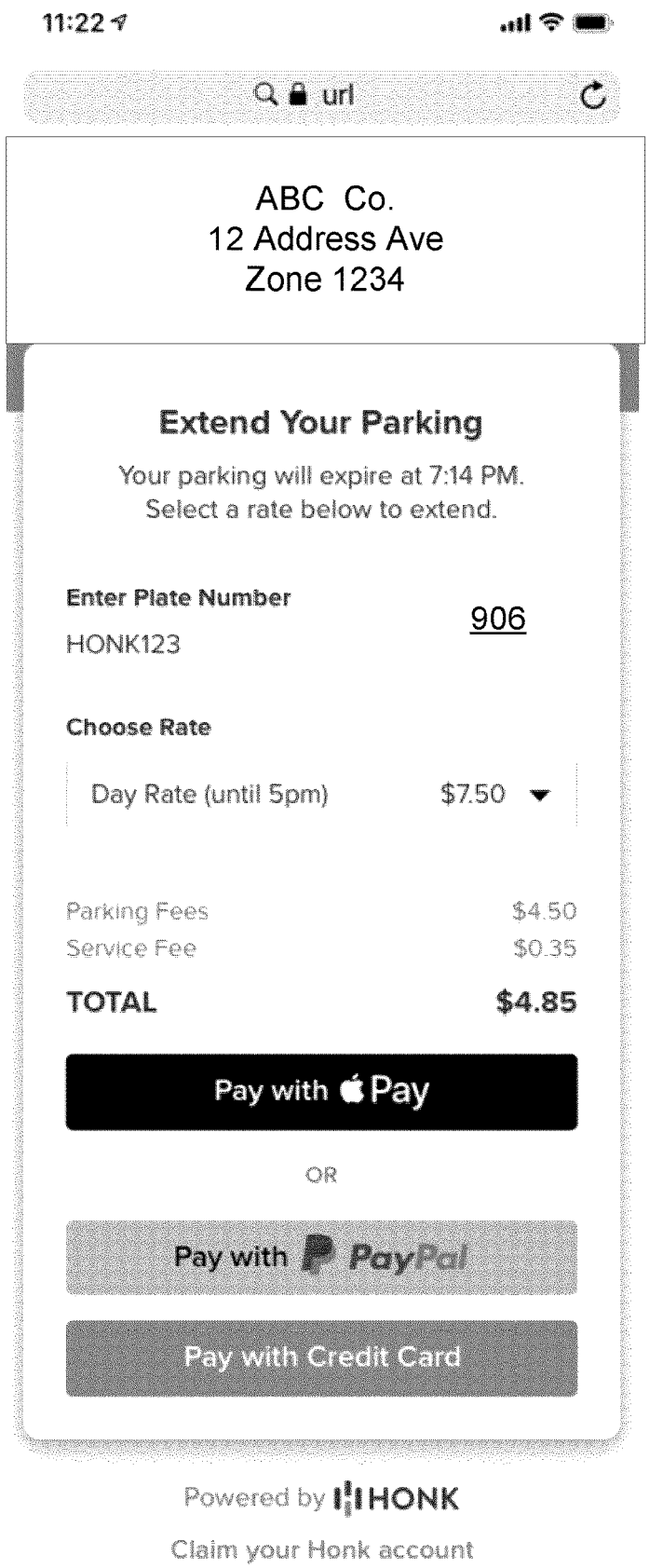

As indicated in UI display screen 804 FIG. 8, in some example embodiments, the customer is prompted to provide a contact number for receiving text messages (the "SMS number") for the customer UE device 102, and/or an e-mail address, and the parking facilitator system 118 is configured to send an SMS notification to the provided SMS number and/or an-email to the provided e-mail address when the purchased parking session is about to expire. The SMS notification causes a notification message to be displayed on the customer UE device display 214 that includes a user selectable option to commence a parking session extension and payment process. FIG. 9 indicates a user interface screen 906 that will be displayed by the customer UE device's browser 246 in the event that the customer selects the parking session extension option. The interactions between parking facilitator system 118 and the customer's UE device 102 for a parking session extension are similar to those described above in respect of FIG. 6, with the exception that parking facilitator system 118 populates any data fields for which data has previously been provided (e.g. license plate number).

As noted above, the customer is able to purchase a parking session without any pre-registration with parking facilitator system 118 and without downloading a specialized parking app to his or her customer UE device 102. However, as illustrated in FIG. 6, in at least some example embodiments, as part of UI screens 600 (and/or UI screens 702, 804, 906) a user selectable link 614 is included in the information displayed by browser 246. User selection of the link 614 will direct the browser 246 of UE device 102 to a service that allows the customer to download a specialized parking app for future use.

In some embodiments, the webpage or file for each of the NFC tags 112 that corresponds to the URL encoded on each of the NFC tags 112 may be dynamically configured or constructed by the parking facilitator system 118 in real-time or near real-time, depending on whether the customer UE device 102 activating or accessing a particular NFC tag 112 is currently in a parking session associated with the parking zone identified by the NFC TAG UID. For example, if a customer UE device 102 activating or accessing a particular NFC tag 112 is not currently in a parking session, the webpage or file configured for the NFC tag 112 and associated with the URL encoded on the NFC tag 112 may display a message regarding a parking rate for the corresponding physical parking zone; and if a customer UE device 102 activating or accessing a particular NFC tag 112 is determined to be currently in a parking session, the webpage or file configured for the NFC tag 112 and associated with the URL encoded on the NFC tag 112 may display a message regarding the current parking session and a payment amount owed, as further described below.

In example embodiments, a parking facilitator system 118 is configured to facilitate post-paid parking sessions. Post-paid parking sessions may be particularly useful in a scenario where a user does not know for how long he or she may park, or when a user is dropping of the vehicle with a valet and would prefer to pay for the parking upon exit from the parking lot. As a customer UE device 102 is within range of the NFC tag 112 and retrieves the URL for parking, the parking facilitator system 118 needs to determine if this UE device 102 is currently in a post-paid parking session, and if it is, the assumption is that the customer associated with the customer UE device 102 wishes to make payment for the parking session and exit the parking zone, accordingly, the parking facilitator system 118 is configured to construct a webpage for the URL showing the payment amount owed for the current parking session. If this UE device 102 is currently not in a post-paid parking session, then the assumption is that the customer associated with the customer UE device 102 wishes to start a parking session, either pre-paid or post-paid, accordingly, the parking facilitator system 118 is configured to construct a webpage for the URL showing a parking rate for the parking zone. In other words, the webpage hosted at the URL is dynamically constructed based on whether the UE device 102 is currently associate with a parking session. The user can then quickly tap to park or make payment without having to download any mobile application.

Figure 10:
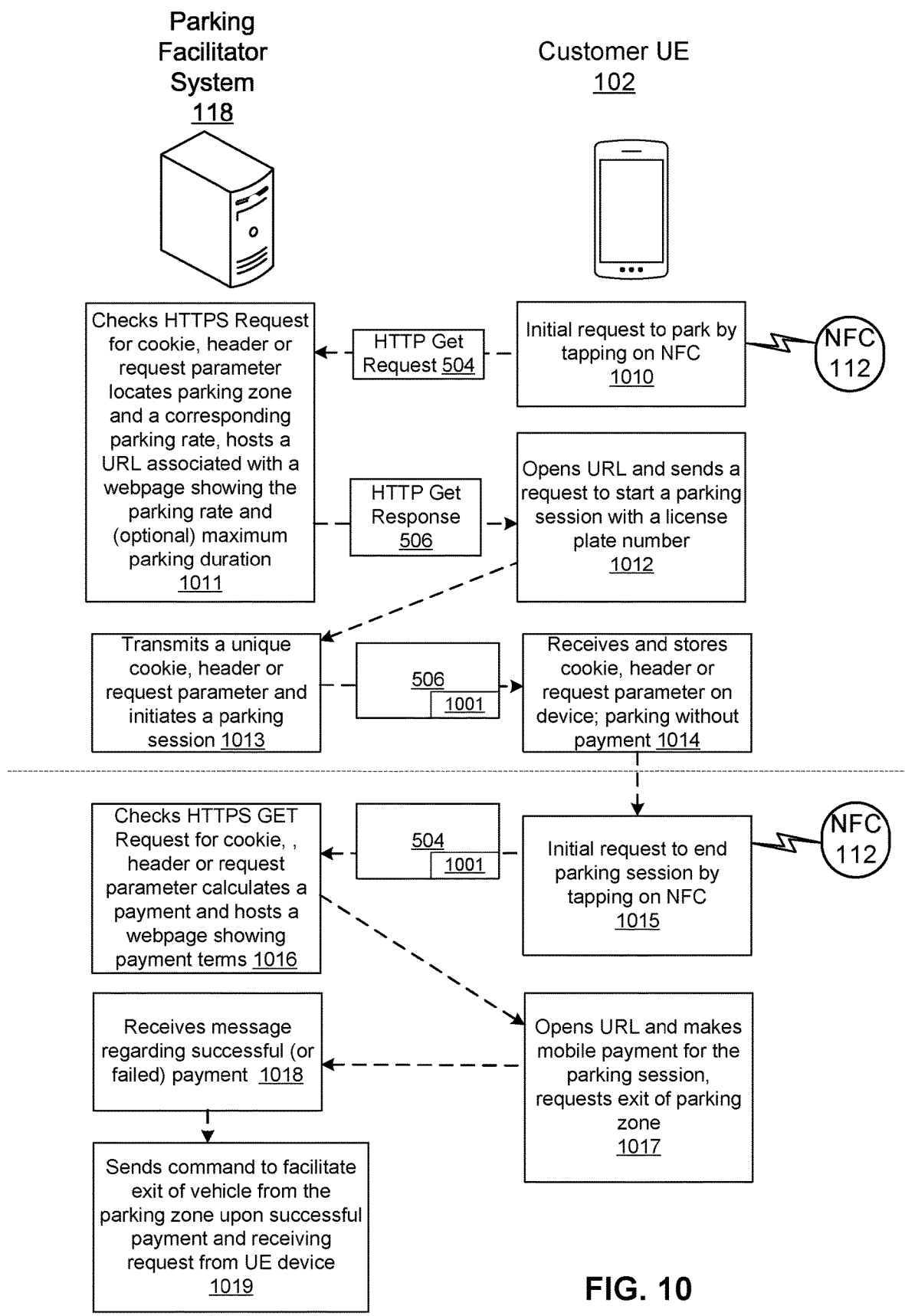
FIG. 10 shows a block diagram illustrating communications between a parking facilitator system and a customer UE device in accordance with example embodiments of the present disclosure.

Referring now to FIG. 10, at step 1010, a customer may send an initial request to park by bringing customer UE device 102 sufficiently close to the parking zone station 110($i$) (where i=1, . . . , N) that is associated with the parking zone 106($i$) to read the URL encoded on the NFC tag 112 of the parking zone station 110($i$). In example embodiments, the customer UE device 102 is configured by NFC tag reader module 244 to periodically send RF signals to interrogate and NFC devices that may be within range, and accordingly a prospective customer can initiate the parking purchase and payment process simply by tapping (or by coming with NFC range, for example 5 cm), of the passive NFC tag 112 of the parking zone station 110($i$).

Once in range of NFC tag 112, the NFC transceiver 216$c$ of the customer UE device 102 receives the URL encoded on the NFC tag 112, which includes a path to a unique webpage hosted by parking facilitator system 118 for the parking zone station 110($i$). In the example of FIG. 5, the URL included in the NFC payload 502 received by NFC tag reader module 244 of customer UE device 102 is https://www.honkmobile.com/asset/ABC123. In example embodiments, the NFC tag reader module 244 interacts with web browser 246 of customer UE device 102 to automatically direct the web browser 246 to the specified URL by sending a HTTPS GET request to a server in the parking facilitator system 118.

At step 1011, as the server in the parking facilitator system 118 receives the HTTPS GET request 504, the system 118 checks for any HTTP cookie (also known as web cookie, Internet cookie, browser cookie, or simply cookie) that may be contained within the HTTPS GET request, such as a cookie 1001 previously sent to the customer UE device 102 by the system 118. As this is an initial request to park, the server will not find a cookie that indicates that the customer UE device 102 is already associated with a parking session, and therefore proceeds on the assumption that the customer UE device 102 wishes to establish a new parking session. The system 118, based on the UID in the URL, locates a parking zone and a corresponding parking rate, then constructs or configures a webpage showing the parking rate and can optionally display a maximum parking duration (e.g. 12 hours). The webpage also can show fields in which the customer can enter license plate number and a click button for the customer to confirm a request to start a post-paid parking session at the parking zone based on the parking rate displayed.

It is worth noting that while the customer UE device 102 may indeed send one or more cookies with the initial HTTPS GET request 504, if the UE device 102 has not been used to start a parking session for the parking zone that has not yet been paid for, the system 118 will not find a cookie associating the UE device 102 with a current parking session.

In some embodiments, instead of, or in addition to using a HTTP cookie, the server in the parking facilitator system 118 may use Application Programming Interface (API) requests to query locally stored data on the customer UE device 102 in order to determine if the device 102 is associated with a parking session, and if it is associated with a parking session, how long the parking session has lasted at a given point in time. For example, the server may send a query to the customer UE device 102 for one or more specific data items that may be configured to indicate if a parking session is ongoing, with which parking zone the parking session is associated, and how long the parking session has lasted. For another example, the server may be configured to use a header or request parameter to initiate and track a parking session. The header or request parameter may be transmitted using a parameter (e.g. a session parameter or a local storage parameter) using JavaScript™. The system or method may be configured to set and store a value in a local storage on a customer UE device, and later retrieve the value for tracking or monitoring a parking session associated with the customer UE device. Throughout this disclosure, it should be understood that a cookie may be replaced with such a header or request parameter for the purpose of initiating, tracking, monitoring a parking session.

In some embodiments, the webpage may display an option (e.g. a clickable button) to start a pre-paid parking session. If the customer UE device 102 selects the pre-paid parking session, the parking facilitator system 118 establishes a parking purchase and payment session with the customer UE device 102 during which the parking facilitator system 18 provides instructions and data to the browser 246 of customer UE device 102 to enable UI display screes such as that shown in FIGS. 6 to 8, described earlier. In some embodiments, the system 118 is configured to check for any eligible offer, incentive or promotion (e.g. first half an hour of parking is free) for the parking zone, and if such an offer, incentive or promotion is found, the system 118 can automatically re-calculate a pre-paid parking amount based on an applicable parking offer such as first 30 minutes of parking is free.

In a post-paid parking scenario, at step 1012, the customer UE device 102 then sends a request to start a post-paid parking session with a license plate number. In some embodiments, as an optional step, after receiving the request to start a pre-paid or post-paid parking session, the system 118 may send a request to the customer UE device 102 for a pre-authorized amount via a payment method (e.g. a credit card on file or Apple Pay™) up to a certain limit (e.g. a maximum daytime parking limit). This pre-authorized amount is not charged yet at this point; it is an authorization for the system 118 to charge the customer for any balance due via the customer's payment method, either in a post-paid scenario, or a pre-paid scenario when the pre-paid amount is not enough for the final amount due for the parking session (e.g. the customer has pre-paid for one hour parking but the parking session has lasted two hours).

At step 1013, the system 118 receives the request for post-paid parking along with the license plate information, and sends a HTTPS GET response 506 back to the user device 102, the HTTPS response including a unique identifier such as a HTTP cookie 1001 which is configured to be stored on the UE device 102. This cookie 1001 may be a small piece of data such as a string. For example, the cookie 1001 may include a string "UEDevice123" identifying the UE device 102. For another example, the cookie 1001 may include a timestamp corresponding to the start time of the parking session, e.g., "UEDevice123_EST915AM", where EST915AM is a timestamp. For yet another example, the cookie 1001 may include a license plate number associated with the UE device, e.g., "B1234TWE", "UEDevice123_B1234TWE", or "B1234TWE_EST915AM", where B1234TWE is the license plate number. The HTTPS GET response may also include a message confirming that a post-paid parking has started at time T at a rate X/hour.

At step 1014, the UE device 102 receives the HTTPS response and stores the cookie 1001 sent by the system 118. The customer can now park without payment or give the car keys to a valet for parking.

At step 1015, the customer is ready to exit the parking zone, and taps the UE device 102 to NFC tag 112 to initiate a request to end parking session. Again, the NFC transceiver 216c of the customer UE device 102 receives the URL encoded on the NFC tag 112, which includes a path to a unique webpage hosted by parking facilitator system 118 for the parking zone station 110(i). The URL may be for example https://www.honkmobile.com/asset/ABC123. In example embodiments, the NFC tag reader module 244 interacts with web browser 246 of customer UE device 102 to automatically direct the web browser 246 to the specified URL by sending a HTTPS GET request to a server in the parking facilitator system 118. The HTTPS Get request includes one or more cookies, such as the cookie 1001 identifying the UE device 102 for the parking session.

At step 1016, the system 118 processes the HTTP Get Request 504 to retrieve one or more cookies including cookie 1001, which identifies the UE device 102 as being associated with a current post-paid parking session. Based on the timestamp of the cookie 1001, the system 118 calculates a payment amount owed for the post-paid parking session and constructs or configures the webpage hosted at the URL to show the payment amount and payment options, similar to FIG. 6. In some embodiments, the payment amount may include a fee item for valet parking such as a tip, if the system 118 collects payment and tips for valet parking. In some embodiments, the system 118 is configured to check for any eligible offer, incentive or promotion (e.g. first half an hour of parking is free) for the parking zone, and if such an offer, incentive or promotion is found, the system 118 can automatically re-calculate the parking amount due based on any free parking offer applied to the parking session.

At step 1017, the UE device 102 is configured to visit the webpage at the specified URL retrieved from NFC tag 112, and based on the payment amount displayed on the webpage, the customer can make payment for the parking session using a mobile payment method such as Apple Pay™ or Google Pay™, similar to FIGS. 7 and 8. The customer can then request to exit the parking zone on the webpage.

At step 1018, the system 118 receives a message from payment system 120 indicating that payment for the post-paid parking session has been made. In some cases, if the payment falls through, the system 118 may also receive a message indicating the payment has not been received for the post-paid parking session.

At step 1019, the system 118 receives a user request from the UE device 102 to exit the parking zone or parking facility. The system 118 checks that the payment was successful before allowing the vehicle to exit the parking zone or parking facility. In some cases, the system 118 needs to send a command to facilitate the exit of the parking zone by sending a command to a backend system installed at the parking zone (e.g. a parking garage) to physically let the vehicle exit the parking zone. For example, the backend system may control a barrier (e.g. such as a gate) at the parking exit that when lifted allows a vehicle to exit the parking zone or parking facility.

In some example embodiments, there may be a time limit between the time at which a payment for a post-paid parking is received and the time at which the UE device 102 can request to exit the parking zone or parking facility. The time limit may be pre-determined, for example, a user may have 30 minutes after payment of the post-paid parking session to request exit of the parking zone or parking facility, past which the user will not be able to exit, and may be prompted to make additional payment for parking if he or she wishes to exit.

Figure 11:
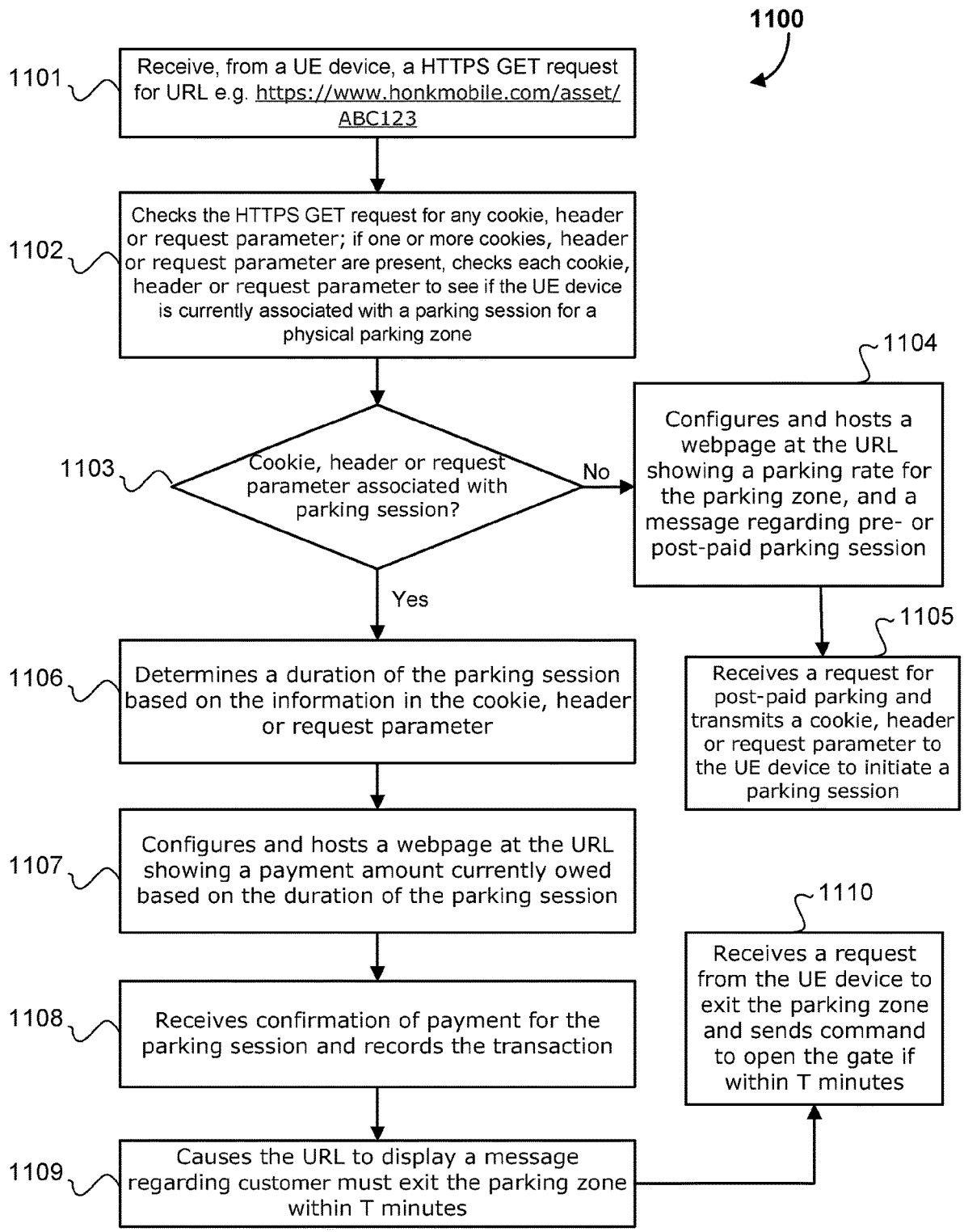
FIG. 11 shows a block diagram illustrating a method performed by a server in a parking facilitator system in accordance with example embodiments of the present disclosure.

Referring now to FIG. 11, which shows an example method 1100 performed by the parking facilitator system 118 in accordance with some embodiments. At step 1101, the system 118 receives, from a UE device 102, a HTTPS GET request 504 for URL e.g. https://www.honkmobile-.com/asset/ABC123. At step 1102, the system 118 checks the HTTPS GET request for any cookie, and if one or more cookies are sent with the request, the system 118 checks each cookie to see if the cookie is currently associated with a parking session for a physical parking zone. If, at step 1103, a cookie 1001 is found to be associated with a post-paid parking session, the system 118 proceeds to step 1106, otherwise, the system 118 at step 1104 configures and hosts a webpage at the URL showing a parking rate for the parking zone, and a message to the UE device 102 to facilitate either a pre-paid or post-paid parking session. If the system 118 receives a request for post-paid parking session at step 1105, it transmits a cookie 1001 to the UE device 102 to initiate a post-parking session. If the system 118 receives a request for pre-paid parking session, then it will display a page for mobile payment in accordance with FIGS. 6 to 8, as described above. In some embodiments, the system 118 is configured to check for any eligible offer, incentive or promotion (e.g. first half an hour of parking is free) for the parking zone, and if such an offer, incentive or promotion is found, the system 118 can automatically re-calculate a pre-paid or post-paid parking amount based on the applicable parking offer, incentive or promotion.

At step 1106, after a cookie 1001 from the UE device 102 has been found to be associated with a post-paid parking session, the system 118 determines a duration of the post-paid parking session based on the information in the cookie 1001.

At step 1107, the system 118 configures and hosts a webpage at the URL showing a payment amount currently owed by the UE device 102 based on the duration of the post-paid parking session previously determined based on the cookie 1001.

At step 1108, the system 118 receives a confirmation of successful payment from the UE device 102 and records the transaction accordingly in the database 122.

At step 1109, the system 118 causes the URL to display a message telling the customer that he or she must exit the parking zone within T minutes, or by a certain time. For example, if the payment was successfully received by the system 118 at 8 PM, then the message may state that the customer must exit the parking zone at 8:30 PM.

At step 1110, the system 118 receives a request from the UE device 102 to exit the parking zone, and if the request complies with the time limit imposed in the previous step, the system 118 sends a command to a backend system installed at the parking exit to physically lift or open the barrier (e.g. a gate) so that the vehicle can exit the parking zone or parking facility.

In some embodiments, the parking facilitator system 118 may use geofencing technology to automate parking payment for one or more customer UE devices 102. Referring back to the method described in association with FIG. 11, steps 1107-1110 describe that the system 118 needs to receive a confirmation that a payment has been made in full for a parking session prior to sending a command to the backend system to physically allow the vehicle associated with the parking session to exit the parking zone. When a geo-fence is utilized, steps 1107 to 1110 may be skipped and replaced with an automatic checkout process. For example, there may be a geo-fence set along the perimeter of the parking zone: the geo-fence can be generated to form a circle around a point location within the parking zone, or can be a predefined set of boundaries based on GPS locations (e.g. an outdoor parking zone) or three dimensional point cloud coordinates (e.g. a multi-story parking garage). The exact geo-fence perimeter information may be stored in database 122.

The system 118 may need to first obtain consent from the customer, via the customer UE device 102, for receiving location information regarding the customer UE device 102. A consent may be given for a fixed amount of time, or for the foreseeable future until the consent is withdrawn or the location access is disabled on the customer UE device 102. Once the consent is received, the system 118 may obtain, from the customer UE device 102, one or more sets of GPS location coordinates of the UE device 102 during the parking session. The system 118 may track, based on the one or more sets of GPS location coordinates, whereabouts of the UE device 102, and specifically, when the UE device 102 has left the geo-fence of the parking zone after the parking session has been initiated, and when the UE device 102 has re-entered the geo-fence of the parking zone, which signals that the parking session is about to end. The system 118 may automatically calculate the duration of the post-paid parking session based on the information in the cookie 1001, the geo-fence, and the GPS location coordinates of the customer UE device 102. For example, the system 118 may determine a parking duration and associated payment amount, based on a timestamp of the cookie associated with the time at which the cookie was placed on the customer UE device 102, which indicates the start of the parking session, and on a timestamp when the system 118 has detected the customer UE device 102 re-entering the geo-fence of the parking zone, which indicates the end of the parking session. The system 118 may compute a duration of the parking session and a parking payment in accordance with the duration of the parking session as well as a parking rate for the parking zone. At this point, the system 118 may cause the customer UE device 102 to display a confirmation to the customer, which may include, for example, the start time and end time of the parking session, the duration of the parking session, and the parking payment that is about to be charged based on a stored payment method associated with the parking session.

As described earlier, the system 118 may have obtained, from the customer, a pre-authorized payment amount up to a certain limit for the parking session at the beginning of the parking session. Shortly after the confirmation displayed on the customer UE device 102, the system 118 may proceed to charge the payment amount in accordance with the stored payment method. If and when the customer UE device 102 proceeds to a parking gate located at the edge of the geo-fence, the system 118 can automatically send the command to open the parking gate, as the parking payment has been automatically charged in full.

The parking facilitator system 118 with geo-fence capabilities may be particular useful when implemented at an open-surface parking lot, where there is no physical gate to prevent vehicles from entering or exiting the parking lot. In an example embodiment, such an open-surface parking lot may have parking facilitator system 118 with geo-fence capabilities implemented. The parking lot may have one or more parking stations 110, and each parking station 110 corresponds to a respective parking zone 106 designed to receive one vehicle. The entire premises of the parking lot may be included in a geo-fence as described above. The geo-fence includes therefore a plurality of parking zones 106 and a plurality of parking stations 110, where each parking zone 106 is associated with a respective parking station 110. Each parking station 110 includes an NFC tag 112 that facilitates communication between a customer UE device 102 and the parking facilitator system 118 via network 116. When a customer or user has parked a vehicle in a parking zone 106 included in the geo-fence, he or she may tap or bring the UE device 102 into close proximity within a parking station 110 associated with the parking zone 106. The parking facilitator system 118 can determine, through a presence or absence of a cookie on a customer UE device 102, whether the customer UE device 102 is currently associated with a parking session for the parking zone 106. If the customer UE device 102 is not yet associated with any parking session for the parking zone 106, then the customer UE device 102 is deemed to have requested a new parking session. The customer may then be prompted to pre-pay (or post-pay, where appropriate) for the parking session of a certain parking duration. A default parking duration may be pre-determined. In some embodiments, the customer may select a different parking duration. Once a parking duration is determined, either via system default or user selection, a pre-paid amount due is calculated and displayed on the customer UE device 102. The customer may be presented with different payment options, for example payment option 608 that relies on embedded payment function 248 such as Apple Pay™ or Google Pay™; payment option 610 that relies on a service such as PayPal™; and/or a credit card payment option 612. Payment may be processed by a payment system 120, and the new parking session may start immediately.

In some embodiments, at the same time as requesting payment for a pre-paid parking session, the parking facilitator system 118 may request, via the display of the customer UE device 102, a pre-authorized amount up to a certain limit (e.g. a maximum daytime parking limit). This pre-authorized amount is not charged yet at this point; it is an authorization for the system 118 to charge the customer for any balance due via the customer's payment method, when the pre-paid amount is not enough for the final amount due for the parking session (e.g. the customer has pre-paid for one hour parking but the parking session has lasted two hours). If and when the customer selects a post-pay option for the parking session, the parking facilitator system 118 may automatically request, via the display of the customer UE device 102, a pre-authorized amount up to a certain limit (e.g. a maximum daytime or nighttime parking limit).

Once a parking session is started, a cookie may be sent to the customer UE device 102 by the system 118 to track the device associated with a parking session, and a timer may be started of the parking session. The same (or a different) cookie may be used to track a user device's location within the geo-fenced area. Appropriate reminders may be sent to the customer via SMS message or e-mail, which can be entered by the customer before or after the payment for the pre-paid parking session, based on a current time and the pre-paid initial parking duration. The timer function may be implemented and executed based on the timestamp of one or more messages sent from the customer UE device 102, as well as the timestamp of the cookie sent to the customer UE device 102. Once the customer has returned to a physical location within the geo-fence of the parking lot, the system 118 is notified regarding the customer's location via the cookie present on the customer UE device 102, which can then calculate a total parking duration, and in turn determine if the pre-paid amount is sufficient to cover the total parking duration. If the pre-paid amount is not enough to cover the total parking duration, the parking facilitator system 118 calculates the amount due to be paid by the customer, and automatically charges the amount based on the payment information associated with the pre-authorization. In a post-paid scenario, the parking facilitator system 118 calculates the total amount due to be paid by the customer without any prepaid amount, and automatically charges the total amount based on the payment information associated with the pre-authorization. The system 118 may then send a final receipt via test message or e-mail to the customer, and allows the customer to exit the parking facility by sending a command to a backend system installed at the parking zone (e.g. a parking garage) to physically let the vehicle exit the parking zone. For example, the backend system may control a barrier (e.g. such as a gate) at the parking exit that when lifted allows a vehicle to exit the parking zone or parking facility.

In some embodiments, a parking facilitator system 118 can be configured to monitor and manage a parking facility, such as a commercial parking facility or a visitor parking garage of a property (e.g., a condominium building), where free parking is offered to visitors inside the visitor parking garage. A common issue faced by property management offices is that some visitors may park a car for longer than the permitted parking duration at the parking garage, and the property management office needs to send patrol personnel to check for possible violators of the parking rules at the parking garage, which can be time and resource consuming. In other cases, a resident of the property may actually park his or her own car at a visitor's parking for free, which again may be a violation of parking rules for visitor parking garage. In some example embodiments, the parking facilitator system 118 may be configured to work with a property management system 125 to monitor and manage a visitors' parking garage, as described below.

A person (also referred to as a customer) who is authorized to park at a garage (hereinafter "the parking garage") can enter the parking garage and find an empty parking zone 106($i$) (where i=1, . . . , N) with a corresponding NFC tag 112 at the corresponding parking zone station 110($i$). The person may then use the customer UE device 102 to send an initial request to park by bringing the customer UE device 102 sufficiently close to the parking zone station 110($i$) that is associated with the parking zone 106($i$) to read the URL encoded on the NFC tag 112 of the parking zone station 110($i$).

Once in range of NFC tag 112, the NFC transceiver 216c of the customer UE device 102 receives the URL encoded on the NFC tag 112, which includes a path to a unique webpage hosted by parking facilitator system 118 for the parking zone station 110($i$). In the example of FIG. 5, the URL included in the NFC payload 502 received by NFC tag reader module 244 of customer UE device 102 is https://www.honkmobile.com/asset/ABC123. In example embodiments, the NFC tag reader module 244 interacts with web browser 246 of customer UE device 102 to automatically direct the web browser 246 to the specified URL by sending a HTTPS GET request to a server in the parking facilitator system 118.

As the server in the parking facilitator system 118 receives the HTTPS GET request 504, the system 118 checks for any HTTP cookie (also known as web cookie, Internet cookie, browser cookie, or simply cookie) that may be contained within the HTTPS GET request, such as a cookie previously sent to the customer UE device 102 by the system 118. If and when this is an initial request to park, the server will not find a cookie that indicates that the customer UE device 102 is already associated with a parking session, and therefore proceeds on the assumption that the customer UE device 102 wishes to establish a new parking session. The system 118, based on the UID in the URL, locates a parking zone and optionally a corresponding free maximum parking duration (e.g. N hours), then constructs or configures a webpage showing that the visitor may park for free for a maximum of N hours. The webpage also can show fields in which the customer can enter license plate number as well as a car model, and a separate field for the customer to enter a unit number. In some example embodiments, the webpage may also require a customer to enter either or both of the customer's name and the unit owner's name before allowing access of the parking zone.

It is worth noting that while the customer UE device 102 may indeed send one or more cookies with the initial HTTPS GET request 504, if the UE device 102 has not been used to start a parking session for the parking zone, the system 118 will not find a cookie associating the UE device 102 with a current parking session.

The parking facilitator system 118 may collect the entered information, including one or more of: the license plate, the unit number, the customer's name, and the unit owner's name. The collected information may be transmitted to database 122 for processing and storage. Where appropriate, a consent may be required and received from the customer and the unit owner before their names are stored at database 122. The system 118 then receives the request for visitor parking session along with the collected information, and sends a HTTPS GET response back to the user device 102, the HTTPS response including a unique identifier such as a HTTP cookie which is configured to be stored on the UE device 102. This cookie may be a small piece of data such as a string. For example, the cookie may include a string "UEDevice123" identifying the UE device 102. For another example, the cookie may include a timestamp corresponding to the start time of the parking session, e.g., "UEDevice123_EST915AM", where EST915AM is a timestamp. For yet another example, the cookie may include a license plate number associated with the UE device, e.g., "B1234TWE", "UEDevice123_B1234TWE", or "B1234TWE_EST915AM", where B1234TWE is the license plate number.

The UE device 102 receives the HTTPS response and stores the cookie sent by the system 118. The customer can now park the car at the visitors' parking garage. The HTTPS GET response may also include a message displayed at the UE device 102, confirming that a visitor's parking session has started at time A, and must end before or at time B, based on the maximum parking duration allowed by the property management. The parking facilitator system 118 may set an internal timer at time A to keep track of the parking duration and once the timer indicates that the maximum parking duration has been reached or is about to be reached (e.g. half an hour prior to time B), the system 118 may send a warning or message to the UE device 102 showing that the parking session is about to end at time B.

Once the customer is ready to exit the parking garage, he or she taps the UE device 102 to NFC tag 112 to initiate a request to end parking session. Again, the NFC transceiver 216c of the customer UE device 102 receives the URL encoded on the NFC tag 112, which includes a path to a unique webpage hosted by parking facilitator system 118 for the parking zone station 110(i). The URL may be for example https://www.honkmobile.com/asset/ABC123. In example embodiments, the NFC tag reader module 244 interacts with web browser 246 of customer UE device 102 to automatically direct the web browser 246 to the specified URL by sending a HTTPS GET request to a server in the parking facilitator system 118. The HTTPS Get request includes one or more cookies, such as the cookie identifying the UE device 102 for the parking session.

Next, the system 118 processes the HTTP Get Request 504 to retrieve the previously transmitted cookie, which identifies the UE device 102 as being associated with a current visitor parking session. Based on the timestamp of the cookie, the system 118 confirms that the actual duration of the parking session is within the allowed maximum parking duration. In some example embodiments, if the system 118 has set an internal timer, then it may check with the internal timer (instead of, or in addition to relying on the timestamp of the cookie) to confirm the actual duration of the parking session. If the actual duration is within the allowed maximum parking duration, the system 118 may send a message back to the UE device 102 confirming that the car may exit the parking garage. In some example embodiments, if the actual duration is greater than the allowed maximum parking duration, based on a set of pre-determined rules, the system 118 can calculate a payment amount owed for the post-paid parking session and constructs or configures the webpage hosted at the URL to show the payment amount and payment options, similar to FIG. 6.

The customer may then send a request to the system 118 to exit the parking garage, which when received by the system 118, may trigger transmission of a command to a backend system to open the barrier (e.g. a gate) for the customer. There may be a time limit between the time at which the UE device has tapped the NFC tag 112 to stop the parking session and the time at which the UE device 102 can request to exit the parking zone. The time limit may be pre-determined, for example, a user may have 30 minutes to request exit of the parking zone, past which the user will not be able to exit, and may be prompted to make another tap on the NFC tag 112, or make additional payment for parking if he or she wishes to exit.

In some embodiments, if the actual duration of the parking session exceeds the allowed maximum parking duration, the system 118 may send a warning message via network 116 to the property management system 125 indicating that a visitor has exceeded the maximum parking duration. The warning message may include information including one or more of: license plate number, car model, visitor's name, unit number, unit owner's name, start time of the parking session, end time of the parking session, and so on. The information may already be stored in database 122, and can be retrieved by the property management system 125 on demand or in batch via network 116. The property management system 125 may be configured to analyze the information and determine if there exists any abnormal parking pattern. For example, if a license plate, a visitor's name, a unit number, or a unit owner's name is found to be associated with multiple parking sessions a week, it may be an indication that someone may be trying to use the visitors' parking garage for an ulterior motive (e.g., a resident pretending to be a visitor in order to save on monthly parking fees). For another example, if a license plate or a visitor's name shows up as someone who exceeds the allowed maximum parking duration multiple times in a short period (e.g. twice a week), he or she may be sent a warning regarding following the parking rules at the visitors' parking garage.

In some embodiments, the parking facilitator system 118 may be configured to run a weekly or monthly report based on the information in database 122, to show for example, a number of parking sessions associated with any one of: a unit number, a unit owner, a license plate number, and so on. This report may be used to determine if anyone has been taking advantages of the visitors' parking garage against the parking rules.

In some example embodiments, the parking facilitator system 118 may be connected to a backend system of a parking garage, which may have a NFC tag installed at the entrance to the parking garage. Customers who wish to enter the parking garage may be required to bring the UE device 102 close to the NFC tag and enter necessary information such as license plate number and unit number at the webpage hosted at the URL retrieved from the NFC tag, prior to being granted entrance by the parking facilitator system 118. In this case, the NFC tag is primarily used to screen potential customers of the parking garage, so that if necessary, the property management system 125 may, through the parking facilitator system 118, ban one or more individuals, based on the license plate number or unit number, from using the visitors' parking garage.

In some example embodiments, the parking facilitator system 118 may be connected to a backend system of a parking facility, which may have a mechanical barrier, such as a gate or a garage door, at each of an entrance and an exit of the parking facility. A parking facility may have one or more parking zones. For example, a parking facility may be a parking garage. In some cases, the entrance and the exit of the parking facility may occupy the same physical space, and thus only one mechanical barrier is required. An NFC tag installed near a mechanical barrier may be used to validate a potential customer prior to granting the customer entrance into the parking facility for a parking session. Customers who wish to enter the parking garage may be required to bring the UE device 102 close to the NFC tag. In one example, similar to the post-paid scenario described with reference to FIGS. 10 and 11, the parking facilitator system 118 may detect if the UE device 102 has previously made a payment for the parking session that has not yet occurred, based on one or more cookies present in the UE device 102 transmitted with a HTTP GET Request to the URL retrieved from the NFC tag. In another example, the customer may be required to enter necessary information such as a license plate number or log into a user account at the webpage hosted at the URL retrieved from the NFC tag. The information are then sent to the parking facilitator system 118 which can determine if the UE device 102 has pre-paid for a parking session based on the license plate number, the user account history, or any other suitable identifying information. If a UE device 102 is determined to have already pre-paid for a parking session for the parking facility, the parking facilitator system 118 may send a command to the backend system to lift or open the barrier (e.g. a parking garage gate) to allow access. If the customer UE device 102 has not pre-paid for a parking session at the time of requesting entry into the parking facility, then the parking facilitator system 118 may either request the UE device 102 to pay for a parking session prior to granting entrance to the parking facility.

In some embodiments, even if a UE device 102 has not yet paid for the parking session, the parking facilitator system 118 may let the vehicle enter the parking facility and park within without upfront payment, executing a post-paid parking session, similar to the steps described above with reference to FIGS. 10 and 11. In this case, once the customer is ready to exit the parking facility, he or she can bring the UE device 102 close to a NFC tag installed near the parking facility barrier before exiting the facility. At this point, the parking facilitator system 118 may either request the UE device 102 to pay for the parking session prior to exiting the parking facility, or it may allow the vehicle to exit the parking facility before billing the user's account for a corresponding payment for the parking session. In some cases, a user account may be created for a frequent user of a parking facility. The user account may be configured for automatic payment, such that a customer can, through configuring or setting up his or her user account, give prior consent for the parking facilitator system 118 to charge an amount to a payment method already associated with the user account, such as a stored credit card on file.

Referring to FIG. 3, in example embodiments, blocks 314 and 318 represent functions occurring at parking operator UE device 104 and parking facilitator system 118 during on-going operation of system 100. In particular, in example embodiments Operator App 250 enables parking operator UE device 104 to access in real time parking session information that is maintained by parking facilitator system 118, thereby enabling parking operator enforcement personal to authenticate vehicles parked in parking zones 106 and take enforcement action as required.

As indicated in block 320 of FIG. 3, in example embodiments where the parking facilitator system 118 is operated by a different entity than the parking operator, parking facilitator system 118 can be configured to make payments based on parking session payments received from parking customers for parking zones associated with the parking operator. In such embodiments, when the parking operator is a different entity from the owner of the parking facilitator system, the parking operator and the owner of parking facilitator system may each be compensated by one or more of: a percentage of parking session payments; a set fee per parking zone station; a set fee per parking space; a set fee per municipal address; and a set flat fee per operator.

The steps and/or operations in the flowcharts and drawings described herein are for purposes of example only. There may be many variations to these steps and/or operations without departing from the teachings of the present disclosure. For instance, the steps may be performed in a differing order, or steps may be added, deleted, or modified.

The coding of software for carrying out the above-described methods described is within the scope of a person of ordinary skill in the art having regard to the present disclosure. Machine-readable code executable by one or more processors of one or more respective devices to perform the above-described method may be stored in a machine-readable medium such as the memory of the data manager. The terms "software" and "firmware" are interchangeable within the present disclosure and comprise any computer program stored in memory for execution by a processor, comprising Random Access Memory (RAM) memory, Read Only Memory (ROM) memory, EPROM memory, electrically EPROM (EEPROM) memory, and non-volatile RAM (NVRAM) memory. The above memory types are examples only, and are thus not limiting as to the types of memory usable for storage of a computer program.

General

All values and sub-ranges within disclosed ranges are also disclosed. Also, although the systems, devices and processes disclosed and shown herein may comprise a specific plurality of elements, the systems, devices and assemblies may be modified to comprise additional or fewer of such elements. Although several example embodiments are described herein, modifications, adaptations, and other implementations are possible. For example, substitutions, additions, or modifications may be made to the elements illustrated in the drawings, and the example methods described herein may be modified by substituting, reordering, or adding steps to the disclosed methods.

Features from one or more of the above-described embodiments may be selected to create alternate embodiments comprised of a subcombination of features which may not be explicitly described above. In addition, features from one or more of the above-described embodiments may be selected and combined to create alternate embodiments comprised of a combination of features which may not be explicitly described above. Features suitable for such combinations and subcombinations would be readily apparent to persons skilled in the art upon review of the present application as a whole.

In addition, numerous specific details are set forth to provide a thorough understanding of the example embodiments described herein. It will, however, be understood by those of ordinary skill in the art that the example embodiments described herein may be practiced without these specific details. Furthermore, well-known methods, procedures, and elements have not been described in detail so as not to obscure the example embodiments described herein. The subject matter described herein and in the recited claims intends to cover and embrace all suitable changes in technology.

Although the present disclosure is described at least in part in terms of methods, a person of ordinary skill in the art will understand that the present disclosure is also directed to the various elements for performing at least some of the aspects and features of the described methods, be it by way of hardware, software or a combination thereof. Accordingly, the technical solution of the present disclosure may be embodied in a non-volatile or non-transitory machine-readable medium (e.g., optical disk, flash memory, etc.) having stored thereon executable instructions tangibly stored thereon that enable a processing device to execute examples of the methods disclosed herein.

The term "processor" may comprise any programmable system comprising systems using microprocessors/controllers or nanoprocessors/controllers, digital signal processors (DSPs), application specific integrated circuits (ASICs), field-programmable gate arrays (FPGAs) reduced instruction set circuits (RISCs), logic circuits, and any other circuit or processor capable of executing the functions described herein. The term "database" may refer to either a body of data, a relational database management system (RDBMS), or to both. As used herein, a database may comprise any collection of data comprising hierarchical databases, relational databases, flat file databases, object-relational databases, object oriented databases, and any other structured collection of records or data that is stored in a computer system. The above examples are example only, and thus are not intended to limit in any way the definition and/or meaning of the terms "processor" or "database".

The present disclosure may be embodied in other specific forms without departing from the subject matter of the claims. The described example embodiments are to be considered in all respects as being only illustrative and not restrictive. The present disclosure intends to cover and embrace all suitable changes in technology. The scope of the present disclosure is, therefore, described by the appended claims rather than by the foregoing description. The scope of the claims should not be limited by the embodiments set forth in the examples, but should be given the broadest interpretation consistent with the description as a whole.

The invention claimed is:

1. A system for facilitating parking sessions in parking zones, the system including at least one server configured to:
receive, through a communication network and from a first remote user equipment (UE) device, information associating a unique identification (UID) encoded on a passive NFC tag with a parking zone identification (ID) that identifies a physical parking zone;
generate a geofence, wherein the geo-fence is set along a perimeter of the physical parking zone to set predefined boundaries of the parking zone based upon three-dimensional point cloud coordinates of the physical parking zone and details of the geo-fence are stored in the database;
update the database to associate the UID with the parking zone ID and parking rate data for the physical parking zone;
host a URL that includes the UID, wherein the URL is associated with a webpage;
receive, from a second remote UE device that has received the URL from the NFC tag, a HTTPS GET request for the URL;
process the HTTPS GET request to determine if the request contains a cookie, header or request parameter indicating that the second remote UE device is currently associated with a parking session for the physical parking zone;
upon determining that the second remote UE device is currently not associated with any parking session for the physical parking zone, associate a parking session for the physical parking zone with the second remote UE device, and start the parking session by transmitting the cookie, header or request parameter indicating when the parking session is started;
upon determining that the second remote UE device is currently associated with the parking session for the physical parking zone based upon the cookie header or request parameter in the request, and based upon tracking a GPS coordinate of the second remote UE device and detecting a re-entry of the second remote UE device within the geo-fence covering at least the physical parking zone:
automatically determine a duration of the parking session based on the information in the cookie, header or request parameter, the GPS coordinates, and the re-entry within the geo-fence; and
construct the webpage for the URL for displaying on the second remote UE device before the second remote UE moves out of the geo-fence, wherein the constructed webpage shows a payment amount owed for the parking session based on the duration; and
upon receiving a message that the parking payment has been successfully made and a request from the second remote UE device to exit the physical parking zone, transmit a command to a backend system of the physical parking zone to facilitate said exit,
wherein the backend system controls a gate at the parking exit that allows a vehicle to exit the parking zone.

2. The system of claim 1, wherein the command to the physical parking zone is only transmitted if the request from the second remote UE device to exit the physical parking zone is received within a pre-determined time period from receipt of the message indicating that the parking payment has been successfully made.

3. A method performed at a server system for facilitating parking sessions in parking zones, comprising:
receiving, through a communication network and from a first remote user equipment (UE) device, information associating a unique identification (UID) encoded on a passive NFC tag with a parking zone identification (ID) that identifies a physical parking zone;
generating a geofence, wherein the geo-fence is set along a perimeter of the physical parking zone to set predefined boundaries of the parking zone based upon three-dimensional point cloud coordinates of the physical parking zone and details of the geo-fence are stored in the database;

updating the database to associate the UID with the parking zone ID and parking rate data for the physical parking zone;

hosting a URL that includes the UID, wherein the URL is associated with a webpage;

receiving, from a second remote UE device that has received the URL from the NFC tag, a HTTPS GET request for the URL;

processing the HTTPS GET request to determine if the request contains a cookie, header or request parameter indicating that the second remote UE device is currently associated with a parking session for the physical parking zone;

upon determining that the second remote UE device is currently not associated with any parking session for the physical parking zone, associating a parking session for the physical parking zone with the second remote UE device, and starting the parking session by transmitting the cookie, header or request parameter indicating when the parking session is started;

upon determining that the second remote UE device is currently associated with the parking session for the physical parking zone based upon the cookie header or request parameter in the request, and based upon detecting a presence of the second remote UE device within a geo-fence covering at least the physical parking zone:

automatically determine a duration of the parking session based on the information in the cookie, header or request parameter, the GPS coordinates, and the re-entry within the geo-fence; and constructing the webpage for the URL for displaying on the second remote UE device before the second remote UE device before the second remote UE moves out of the geo-fence, wherein the constructed webpage shows a payment amount owed for the parking session based on the duration; and upon receiving a message that the parking payment has been successfully made and a request from the second remote UE device to exit the physical parking zone, transmit a command to a backend system of the physical parking zone to facilitate said exit, wherein the backend system controls a gate at the parking exit that allows a vehicle to exit the parking zone.

4. The method of claim 3, wherein the command to the physical parking zone is only transmitted if the request from the second remote UE device to exit the physical parking zone is received within a pre-determined time period from receipt of the message indicating that the parking payment has been successfully made.

* * * * *